US011865899B2

(12) United States Patent
Ishizeki

(10) Patent No.: US 11,865,899 B2
(45) Date of Patent: Jan. 9, 2024

(54) VEHICLE AIR CONDITIONING DEVICE

(71) Applicant: SANDEN AUTOMOTIVE CLIMATE SYSTEMS CORPORATION, Isesaki (JP)

(72) Inventor: Tetsuya Ishizeki, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 403 days.

(21) Appl. No.: 17/266,771

(22) PCT Filed: Jul. 4, 2019

(86) PCT No.: PCT/JP2019/026549
§ 371 (c)(1),
(2) Date: Feb. 8, 2021

(87) PCT Pub. No.: WO2020/044785
PCT Pub. Date: Mar. 5, 2020

(65) Prior Publication Data
US 2021/0316593 A1 Oct. 14, 2021

(30) Foreign Application Priority Data
Aug. 27, 2018 (JP) .................. 2018-158320

(51) Int. Cl.
*B60H 1/00* (2006.01)
(52) U.S. Cl.
CPC ..... *B60H 1/00921* (2013.01); *B60H 1/00278* (2013.01); *B60H 1/00764* (2013.01);
(Continued)
(58) Field of Classification Search
CPC ............ B60H 1/00921; B60H 1/00278; B60H 1/00764; B60H 1/00785; B60H 1/00914; B60H 2001/00928; B60H 2001/00961
See application file for complete search history.

(56) References Cited

U.S. PATENT DOCUMENTS 2,303,857 A * 12/1942 Numero ............. B61D 27/0027
62/239
5,586,448 A * 12/1996 Ikeda ................. B60H 1/00914
62/236
(Continued)

FOREIGN PATENT DOCUMENTS

CN 105517824 B * 5/2018 ......... B60H 1/00385
DE 11-2013-005737 T5 9/2015
(Continued)

OTHER PUBLICATIONS

International Search Report dated Sep. 10, 2019 issued in Patent Application No. PCT/JP2019/026549.
(Continued)

*Primary Examiner* — Ljiljana V. Ciric
(74) *Attorney, Agent, or Firm* — Pearne & Gordon, LLP

(57) ABSTRACT

The vehicle air conditioning device includes a compressor, a radiator, an outdoor heat exchanger, and an air conditioning controller, and a cabin is, air conditioned with power supplied from a battery. The air conditioning controller can perform air conditioning operation that causes a refrigerant from the compressor to radiate heat in the radiator, decompresses the refrigerant, causes the refrigerant to absorb heat in the outdoor heat exchanger so as to heat the cabin, and defrosting operation that causes the refrigerant from the compressor to radiate heat in the outdoor heat exchanger so as to defrost the outdoor heat exchanger, and determines whether it is possible to perform the defrosting operation on the basis of outside humidity.

10 Claims, 14 Drawing Sheets

(52) U.S. Cl.
CPC ..... *B60H 1/00785* (2013.01); *B60H 1/00914* (2013.01); *B60H 2001/00928* (2013.01); *B60H 2001/00961* (2019.05)

(56) References Cited

U.S. PATENT DOCUMENTS

| | | | | |
|---|---|---|---|---|
| 5,685,162 | A * | 11/1997 | Iritani | B60H 1/00921 62/90 |
| 5,983,652 | A * | 11/1999 | Iritani | B60H 1/00921 62/197 |
| 6,330,909 | B1 | 12/2001 | Takahashi et al. | |
| 6,430,951 | B1 * | 8/2002 | Iritani | B60H 1/00814 62/90 |
| 8,540,166 | B2 * | 9/2013 | Nemoto | B60H 1/00885 123/41.11 |
| 9,517,680 | B2 * | 12/2016 | Suzuki | B60H 1/00064 |
| 9,776,469 | B1 * | 10/2017 | Smith | B60W 20/15 |
| 9,797,641 | B2 | 10/2017 | Suzuki et al. | |
| 9,855,822 | B2 * | 1/2018 | Suzuki | B60H 1/00064 |
| 9,925,877 | B2 * | 3/2018 | Miyakoshi | B60L 1/003 |
| 9,944,256 | B2 * | 4/2018 | Miyakoshi | F25B 6/04 |
| 10,000,107 | B2 * | 6/2018 | Hamamoto | B60H 1/00007 |
| 10,118,458 | B2 * | 11/2018 | Kim | H01M 10/663 |
| 10,166,841 | B2 * | 1/2019 | Larson | B60H 1/3207 |
| 10,183,544 | B2 * | 1/2019 | Kim | F25B 25/005 |
| 10,189,332 | B2 * | 1/2019 | Miyakoshi | B60H 1/00007 |
| 10,220,678 | B2 * | 3/2019 | Miyakoshi | F25B 47/022 |
| 10,279,654 | B2 * | 5/2019 | Miyakoshi | F25B 41/24 |
| 10,302,346 | B2 * | 5/2019 | Ragazzi | F25B 30/02 |
| 10,479,170 | B2 | 11/2019 | Enomoto et al. | |
| 11,254,188 | B2 | 2/2022 | Ishizeki et al. | |
| 2013/0291577 | A1 * | 11/2013 | Miyakoshi | B60H 1/00907 62/151 |
| 2015/0314668 | A1 | 11/2015 | Suzuki et al. | |
| 2016/0084554 | A1 | 3/2016 | Suzuki et al. | |
| 2016/0116192 | A1 * | 4/2016 | Kim | F25B 5/04 62/115 |
| 2016/0339767 | A1 | 11/2016 | Enomoto et al. | |
| 2017/0158022 | A1 * | 6/2017 | Kim | F25B 41/20 |
| 2019/0164421 | A1 | 5/2019 | Lauer et al. | |
| 2020/0047583 | A1 | 2/2020 | Ishizeki et al. | |
| 2022/0134842 | A1 | 5/2022 | Ishizeki et al. | |

FOREIGN PATENT DOCUMENTS

| | | | |
|---|---|---|---|
| DE | 11-2014-002644 A1 | 2/2016 | |
| DE | 11-2015-000552 A1 | 11/2016 | |
| DE | 10-2016-210130 A1 | 12/2017 | |
| DE | 11-2018-002250 T5 | 1/2020 | |
| FR | 2957851 A1 * | 9/2011 | ......... B60H 1/00907 |
| JP | S61-223445 A | 10/1986 | |
| JP | H10-103818 A | 4/1998 | |
| JP | 2001-071734 A | 3/2001 | |
| JP | 2011-237052 A | 11/2011 | |
| JP | 2012-176660 A | 9/2012 | |
| JP | 2014-108647 A | 6/2014 | |
| WO | WO-2008078186 A1 * | 7/2008 | ......... B60H 1/00764 |
| WO | WO-2018064054 A1 * | 4/2018 | ......... B60H 1/00278 |

OTHER PUBLICATIONS

Office Action dated Mar. 11, 2022 for the corresponding German Patent Application No. 112019004278.5.

* cited by examiner

FIG. 15
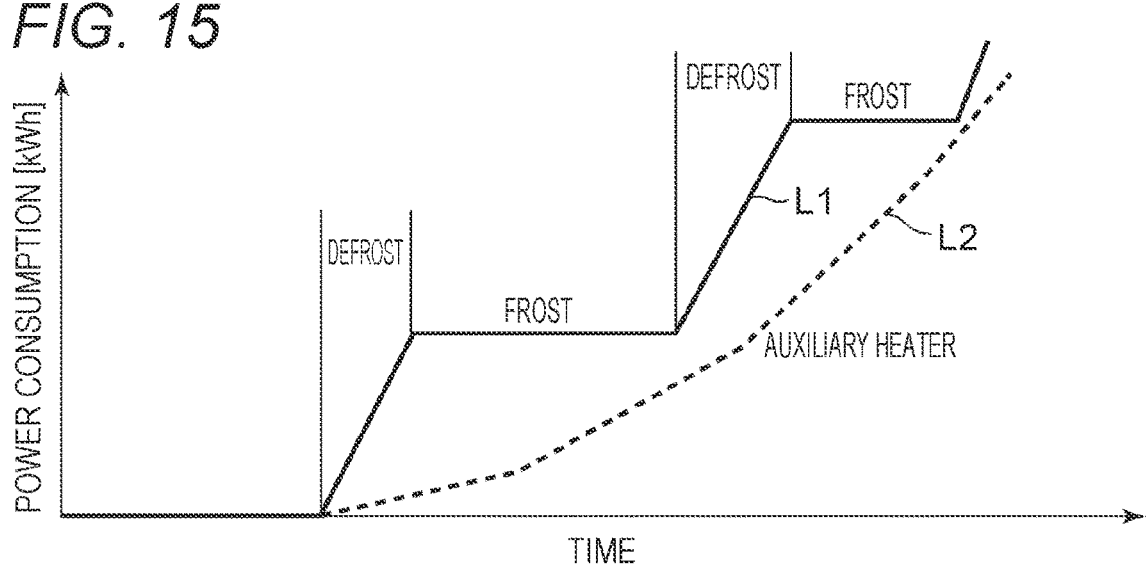
FIG. 16
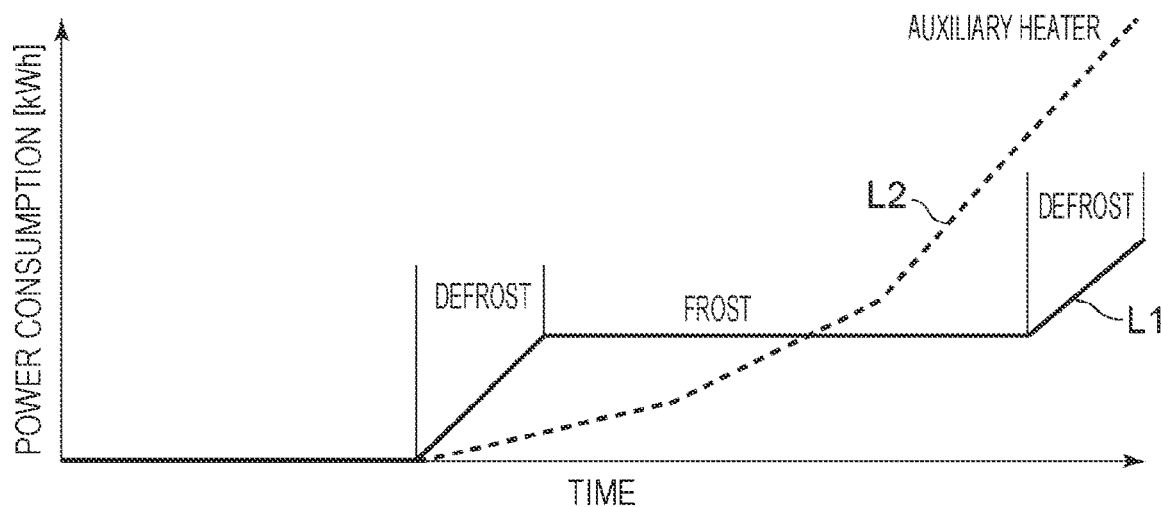
FIG. 17
| OUTSIDE TEMPERATURE  OUTSIDE HUMIDITY | -20 | -15 | -10 | -5 |
|---|---|---|---|---|
| 80 | NG | NG | NG | NG |
| 70 | NG | OK | OK | NG |
| 60 | NG | OK | OK | OK |
| 50 | OK | OK | OK | OK |

VEHICLE AIR CONDITIONING DEVICE

TECHNICAL FIELD

The present invention relates to a heat pump type vehicle air conditioning device to which power is supplied from an on-vehicle battery, and particularly to defrosting of an outdoor heat exchanger.

BACKGROUND ART

In view of the environment problems that have become apparent recently, vehicles in which a travel motor is driven by electric power supplied from an on-vehicle battery, such as electric vehicles or hybrid vehicles, have been widely used. One of the developed air conditioning devices that are usable in such vehicles includes a refrigerant circuit in which an electric compressor that is driven by electric power supplied from a battery, a radiator, a heat sink, and an outdoor heat exchanger are connected. To heat a cabin of a vehicle, a refrigerant discharged from the compressor radiates heat in the radiator and the refrigerant having radiated heat in this radiator absorbs heat from the external air in the outdoor heat exchanger. To cool the cabin, the refrigerant discharged from the compressor radiates heat in the outdoor heat exchanger and the refrigerant absorbs heat in the heat sink.

When the cabin is heated, the refrigerant absorbs heat in the outdoor heat exchanger and the temperature becomes lower; thus, the moisture in the external air becomes frost and the frost adheres to the outdoor heat exchanger. When the adhered frost becomes larger in the outdoor heat exchanger, the heat exchange with the external air is interrupted and therefore, the heating capability deteriorates. In view of this, the outdoor heat exchanger is defrosted by feeding the refrigerant with high temperature discharged from the compressor to the outdoor heat exchanger so that heat is radiated (for example, see Patent Literature 1).

CITATION LIST

Patent Literature
Patent Literature 1: JP-A-2011-237052

SUMMARY OF THE INVENTION

Problems to be Solved by the Invention

The electric vehicle whose battery is charged from an external power source (charging device) or the hybrid vehicle that can be charged has a structure in which the compressor is operated during the charging to defrost the outdoor heat exchanger as described above. In recent years, however, since the battery capacity has increased, it is unnecessary to frequently charge the battery and it may be advantageous to defrost the outdoor heat exchanger also while the charging is not performed (for example, while the vehicle stops or travels, including when the cabin is air-conditioned).

However, the defrosting operation of the outdoor heat exchanger also needs to drive the compressor and this consumes energy. Therefore, when the outdoor heat exchanger is defrosted while the charging is not performed, the residue of the battery may decrease too much and the travel may be unable to continue.

The present invention has been made in order to solve the conventional technical problem, and an object is to provide a vehicle air conditioning device that can increase the heat absorption from the external air in the outdoor heat exchanger while the influence on the travel distance is reduced as much as possible.

Solution to the Problems

A vehicle air conditioning device according the present invention is for performing air conditioning in a cabin with electric power supplied from a battery, the vehicle air conditioning device including: a compressor that compresses a refrigerant; a radiator that causes the refrigerant to radiate heat so as to heat air to be supplied to the cabin; an outdoor heat exchanger that is provided outside the cabin; and a control device, wherein the control device is able to perform at least air conditioning operation that causes the refrigerant discharged from the compressor to radiate heat in the radiator, decompresses the refrigerant that has radiated heat, and then causes the refrigerant to absorb heat in the outdoor heat exchanger so as to heat the cabin, and defrosting operation that causes the refrigerant discharged from the compressor to radiate heat in the outdoor heat exchanger so as to defrost the outdoor heat exchanger, and the control device determines whether it is possible to perform the defrosting operation on the basis of outside humidity.

In the vehicle air conditioning device in one embodiment of the present invention, when the outside humidity is more than or equal to a predetermined threshold, the control device does not permit the defrosting operation in the invention described above.

In the vehicle air conditioning device in one embodiment of the present invention, the control device changes the threshold to become lower in accordance with the outside temperature that becomes lower in the invention described above.

In the vehicle air conditioning device in one embodiment of the present invention, the control device calculates an energy quantity Ed necessary to defrost the outdoor heat exchanger on the basis of the outside temperature and calculates an energy quantity Ea that that represents an amount of heat that can be absorbed from external air in the outdoor heat exchanger after the defrosting operation, on the basis of the outside temperature and the outside humidity, and the control device permits the defrosting operation when it is determined that a gain by heat absorption from the external air is obtained as a result of comparing these energy quantities Ed and Ea in one embodiment of the present application.

In the vehicle air conditioning device one embodiment of the present invention whets a residual energy quantity of the battery is less than or equal to a predetermined threshold, the control device does not permit the defrosting operation regardless of the outside humidity in each aspect of the invention described above.

In the vehicle air conditioning device in one embodiment of the present invention, when the gain by the heat absorption from the external air is expected to be obtained based on a weather forecast information, the control device permits the defrosting operation regardless of the outside humidity in each aspect of the invention described above.

In the vehicle air conditioning device in one embodiment of the present invention, when the outside temperature is expected to increase on the basis of the weather forecast information, the control device does not permit the defrosting operation regardless of the outside humidity in each aspect of the invention described above.

In the vehicle air conditioning device in one embodiment of the present invention, when the gain by the beat absorption from the external air is expected to be obtained on the basis of navigation information, the control device permits the defrosting operation regardless of the outside humidity in each aspect of the invention described above.

In the vehicle air conditioning device one embodiment of the present invention, when the gain by the heat absorption from the external air is expected to be obtained on the basis of a future driving state of a vehicle that is expected based on a driving, state history information, the control device permits the defrosting operation regardless of the outside humidity in each aspect of the invention described above.

In the vehicle air conditioning device in one embodiment of the present invention, the control device forcibly performs the defrosting, operation on the basis of a predetermined input operation in each aspect of the invention described above.

Effects of the Invention

Defrosting the outdoor heat exchanger can increase the heat absorption from the external air; however, the defrosting operation requires energy (electric power) for driving the compressor and accordingly, the electric power in the battery is consumed. Therefore, depending on the energy quantity required to defrost the outdoor heat exchanger and the energy quantity at which heat can be absorbed from the external air in the defrosted outdoor heat exchanger, it may be advantageous in a case where the defrosting operation is performed or a case where the defrosting operation is not performed.

On the other hand, the frosting of the outdoor heat exchanger is largely influenced by the outside humidity, and in the environment with low outside humidity, it takes time to frost the outdoor heat exchanger; however, in the environment with high outside humidity, the outdoor heat exchanger is frosted before enough heat absorption is obtained from the external air. Therefore, when the outside humidity is low, defrosting is advantageous because the heat absorption from the external air increases; however, when the outside humidity is high, the heat absorption corresponding to the power consumption of the battery due to the defrosting cannot be obtained and it may be advantageous not to perform the defrosting.

In view of the above, the present invention provides a vehicle air conditioning device for performing air conditioning in a cabin with electric power supplied from a battery, the vehicle air conditioning device including: a compressor that compresses a refrigerant; a radiator that causes the refrigerant to radiate heat so as to heat air to be supplied to the cabin; an outdoor heat exchanger that is provided outside the cabin; and a control device. When the control device is able to perform at least air conditioning operation that causes the refrigerant discharged from the compressor to radiate heat in the radiator, decompresses the refrigerant that has radiated heat, and then causes the refrigerant to absorb heat in the outdoor heat exchanger so as to heat the cabin, and defrosting operation that causes the refrigerant discharged from the compressor to radiate heat in the outdoor heat exchanger so as to defrost the outdoor heat exchanger, the control device determines whether it is possible to perform the defrosting operation on the basis of outside humidity. For example, as described in one embodiment of the present invention, when the outside humidity is more than or equal to the predetermined threshold, the defrosting operation is not permitted; accordingly, while the adverse influence on the travel distance is minimized, the heat absorption from the external air can be increased by defrosting the outdoor heat exchanger and thus, the cabin can be heated properly.

Here, the energy quantity necessary to defrost the outdoor heat exchanger increases as the outside temperature is lower; therefore, as described in one embodiment of the present invention, when the control device changes the threshold to become lower as the outside temperature becomes lower, whether it is possible to perform the defrosting operation of the outdoor heat exchanger can be determined properly to the outside temperature.

In addition, as described in one embodiment of the present invention, the control device calculates the energy quantity Ed necessary to defrost the outdoor heat exchanger on the basis of the outside temperature, and the control device calculates the energy quantity Ea that represents an amount of heat that can be absorbed from external air in the outdoor heat exchanger after the defrosting operation, on the basis of the outside temperature and the outside humidity, and the control device permits the defrosting operation when it is determined that a gain by heat absorption from the external air is obtained as a result of comparing these energy quantities Ed and Ea. Thus, the defrosting operation of the outdoor beat exchanger can be permitted only when the gain obtained by defrosting the outdoor heat exchanger outweighs the loss from the defrosting itself; thus, whether it is possible to perform the defrosting operation can be determined more properly.

As described in one embodiment of the present invention, where the residual energy quantity of the battery is less than or equal to the predetermined threshold, the control device does not permit the defrosting operation regardless of the outside humidity. Thus, it is possible to avoid for sure the inconvenience that defrosting the outdoor heat exchanger results in the travel failure.

Here, where the outside humidity will decrease after this, even if the defrosting operation is not permittable for now, it is predicted that permitting the defrosting operation can obtain the gain. In view of this, as described in one embodiment of the present invention, where the weather forecast information can be obtained from the outside, when the gain by the heat absorption from the outside is expected to be obtained based on the weather forecast information, the control device permits the defrosting operation regardless of the outside humidity. Thus, whether it is possible to perform the defrosting operation of the outdoor heat exchanger can be determined in accordance with the future environment change.

For example, where the outside temperature is expected to increase from the weather forecast information, the outdoor heat exchanger is very likely to be defrosted naturally. Therefore, as described in one embodiment of the present invention, the defrosting operation is not permitted regardless of the outside humidity. Accordingly, the unnecessary power consumption of the battery can be avoided.

In addition, where it will still take much longer to arrive at the destination, the gain obtained by the heat absorption from the external air is higher when the outdoor heat exchanger is defrosted. In view of this, as described in one embodiment of the present invention, in the case where the navigation information is obtained, for example, in the case where the gain by the heat absorption from the external air is expected to be obtained based on the navigation information, the control device permits the defrosting operation regardless of the outside humidity; thus, whether it is possible to perform the defrosting operation can be determined more properly.

On the contrary, when the travel distance is short, defrosting the outdoor heat exchanger is likely to be disadvantageous. In view of this, for example, as described in one embodiment of the present invention, where the gain by the heat absorption from the external air is expected to be obtained on the basis of a further driving state of the vehicle that is expected based on a driving state history information, the control device permits the defrosting operation regardless of the outside humidity. Thus, in the case where it is expected that the distance the vehicle will drive after this is short on the basis of the past driving state, the defrosting operation is not performed, and the defrosting operation can be performed only when the gain by the heat absorption from the external air is obtained, for example, when the vehicle will drive a long distance.

On the other hand, as described in one embodiment of the present invention, when the control device can forcibly perform the defrosting operation on the basis of the predetermined input operation, for example, in the case where the distance to a facility where the external power source (such as a charger) is set is short and the user determines that using the power from the battery is not a problem, the outdoor heat exchanger is forcibly defrosted and more heat is absorbed from the external air, so that the heating capability of the cabin can be increased.

BRIEF DESCRIPTION OF THE DRAWINGS

FIG. 15 is a diagram for describing a relation between power consumption when the outdoor heat exchanger is defrosted in an environment with high outside humidity and power consumption when heating is assisted by an auxiliary heater.

FIG. 16 is a diagram for describing a relation between power consumption when the outdoor heat exchanger is defrosted in an environment with low outside humidity and power consumption when heating is assisted by the auxiliary heater.

FIG. 17 is a diagram for describing MAP for the air conditioning controller in FIG. 2 to determine whether it is possible to perform the defrosting operation of the outdoor heat exchanger.

DESCRIPTION OF THE EMBODIMENTS

Figure 1:
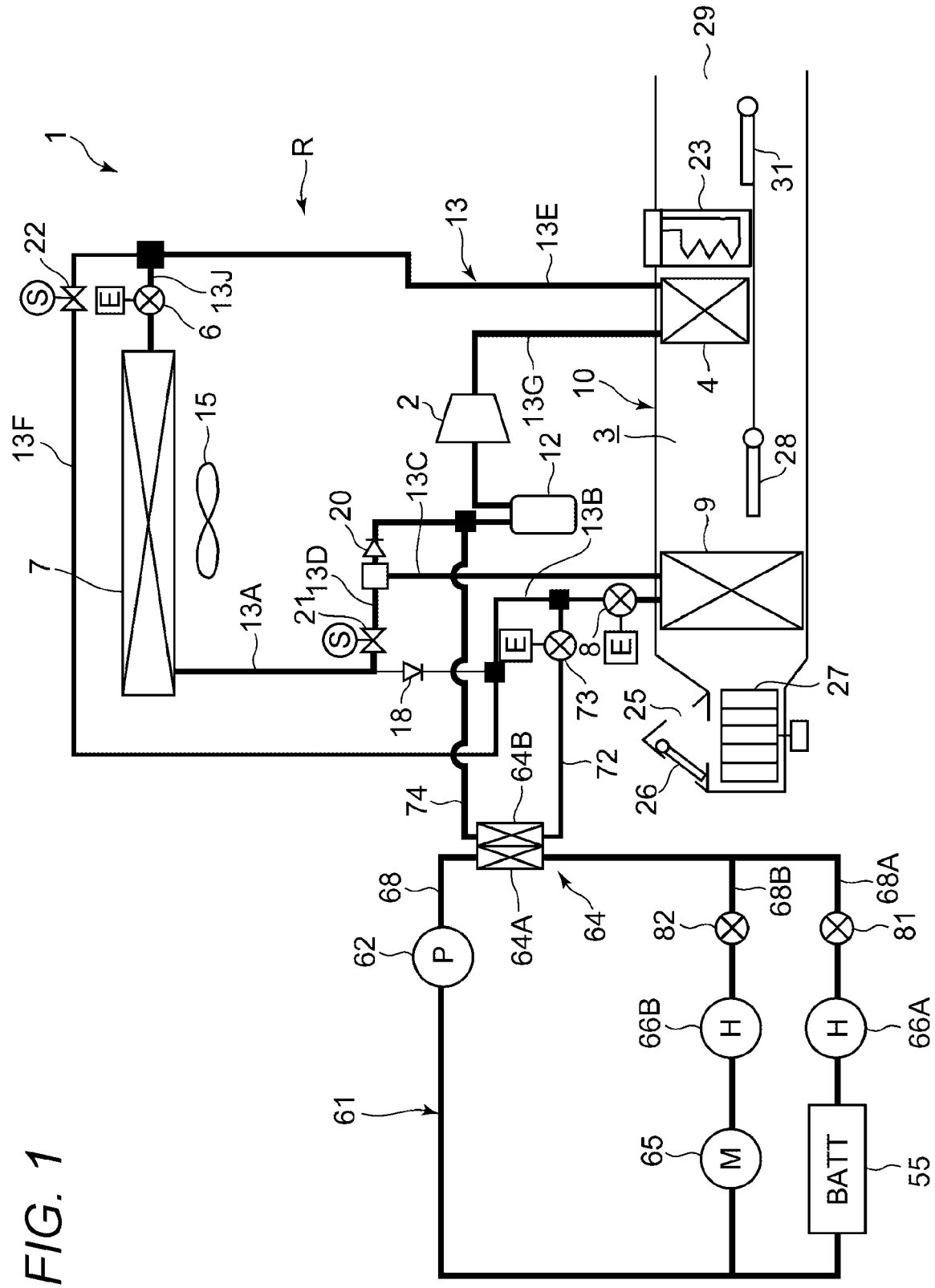
FIG. 1 is a structure diagram of one example of a vehicle air conditioning device to which the present invention is applied.

Embodiments of the present invention are hereinafter described in detail with reference to the drawings. FIG. 1 is a structure diagram of a vehicle air conditioning device 1 according to one example to which the present invention is applied. A vehicle according to the example to which the present invention is applied is an electric vehicle (EV) not incorporating an engine (internal combustion engine), and a battery 55 (for example, lithium battery) is mounted in the vehicle. By supplying the electric power charged in the battery 55 from the external power source such as a quick charger to a travel motor (electric motor) 65, the vehicle is driven to travel. Then, the vehicle air conditioning device 1 is also driven by the power supplied from the battery 55.

That is to say, in the electric vehicle that cannot heat the cabin with the waste heat from the engine, the vehicle air conditioning device 1 performs heating operation (air conditioning operation to heat the cabin) by the heat pump operation using a refrigerant circuit R. Furthermore, the vehicle air conditioning device 1 performs air conditioning in the cabin by selectively performing each air conditioning operation such as dehumidifying and heating operation (this is also the air conditioning operation to heat the cabin), internal cycle operation, dehumidifying and cooling operation, or cooling operation. Note that the vehicle is not limited to such an electric vehicle and may be a so-called hybrid vehicle that uses both an engine and an electric motor for traveling.

The vehicle air conditioning device 1 according to the example is to perform air conditioning in the cabin of the electric vehicle (heating, cooling, dehumidifying, and ventilating), and an electric type compressor (electric compressor) 2 that compresses a refrigerant, a radiator 4 that is provided in an air flow path 3 of an HVAC unit 10 where the air in the cabin passes and circulates, the refrigerant with high temperature and high pressure discharged from the compressor 2 flowing into the radiator 4 through a refrigerant pipe 13G, and causes this refrigerant to radiate heat so as to heat the air to be supplied into the cabin, an outdoor expansion valve 6 including an electric valve that decompresses and expands the refrigerant at the heating, an outdoor heat exchanger 7 that performs heat exchange between the refrigerant and the external air in order to function as a radiator that causes the refrigerant to radiate heat during the cooling operation and function as an evaporator that causes the refrigerant to absorb heat during the heating operation, an indoor expansion valve 8 including an electric valve that decompresses and expands the refrigerant, a heat sink 9 that is provided in the air flow path 3 and causes the refrigerant to absorb heat from inside or outside the cabin in the cooling operation and the dehumidifying operation so as to cool the air to be supplied to the cabin, an accumulator 12, and the like are connected sequentially with a refrigerant pipe 13 and thus, the refrigerant circuit R is formed. The outdoor expansion valve 6 and the indoor expansion valve 8 can decompress and expand the refrigerant and can also be fully opened or closed.

Note that an outdoor fan 15 is provided to the outdoor heat exchanger 7. This outdoor fan 15 is configured to exchange heat between the external air and the refrigerant by forcibly blowing the external air into the outdoor heat exchanger 7 so that the external air is supplied to the outdoor heat exchanger 7 also when the vehicle stops (that is, vehicle speed is 0 km/h).

A refrigerant pipe 13A connected to a refrigerant outlet side of the outdoor heat exchanger 7 is connected to a refrigerant pipe 13B through a check valve 18. Note that a direction from the check valve 18 to the refrigerant pipe 13B is a forward direction, and this refrigerant pipe 13B is connected to the indoor expansion valve 8.

The refrigerant pipe 13A from the outdoor heat exchanger 7 is branched, and this branched refrigerant pipe 13D communicates with, and connects to a refrigerant pipe 13C that is positioned on an outlet side of the heat sink 9 through a solenoid valve 21 that is opened at the heating. A check valve 20 is connected to the refrigerant pipe 13C on the downstream side of the connection point of the refrigerant pipe 13D, and the refrigerant pipe 13C on the downstream side of the check valve 20 is connected to the accumulator 12. The accumulator 12 is connected to a refrigerate suction side of the compressor 2. Note that a direction from the check valve 20 to the accumulator 12 is the forward direction.

Furthermore, a refrigerant pipe 13E on the outlet side of the radiator 4 is branched into a refrigerant pipe 13J and a refrigerant pipe 13F before the outdoor expansion valve 6 (on the refrigerant upstream side), and one of the branched refrigerant pipes, the refrigerant pipe 13J, is connected to a refrigerant inlet side of the outdoor heat exchanger 7 through the outdoor expansion valve 6. The other one of the branched refrigerant pipes, the refrigerant pipe 13F, communicates with and connects to the refrigerant pipe 13B positioned on the refrigerant downstream side of the check valve 18 and on the refrigerant upstream side of the indoor expansion valve 8 through a solenoid valve 22 that is open at the dehumidifying.

Thus, the refrigerant pipe 13F is connected in parallel to a serial circuit of the outdoor expansion valve 6, the outdoor heat exchanger 7, and the check valve 18, and a circuit that bypasses the outdoor expansion valve 6, the outdoor heat exchanger 7, and the check valve 18 is formed.

In the air flow path 3 on the air upstream side of the heat sink 9, suction ports including an external air suction port and an internal air suction port are formed (in FIG. 1, represented by a suction port 25). In this suction port 25, a suction switch dumper 26 is provided. The suction switch dumper 26 switches the air to be introduced into the air flow path 3 between the internal air that is the air in the cabin (internal circulation) and the external air that is the air outside the cabin (external air introduction). Furthermore, an indoor fan (blower fan) 27 is provided on the air downstream side of this suction switch dumper 26. The indoor fan 27 supplies the introduced internal air or external air to the air flow path 3.

In FIG. 1, a reference numeral 23 denotes an auxiliary heater as an auxiliary heating device. In this example, the auxiliary heater 23 is formed by a PTC heater (electric heater), and is provided in the air flow path 3 on the air downstream side of the radiator 4 with respect to the air flow in the air flow path 3. When electricity is supplied to the auxiliary heater 23 and heat is generated, this serves as a so-called heater core and assists to heat the cabin.

In the air flow path 3 on the air upstream side of the radiator 4, an air mix dumper 28 is provided. The air mix dumper 28 adjusts the ratio of the air that is supplied to the radiator 4 and the auxiliary heater 23 to the air (internal air or external air) that has flowed into the air flow path 3, has passed the heat sink 9, and exists in the air flow path 3. In addition, in the air flow path 3 on the air downstream side of the radiator 4, blowing ports of FOOT (foot), VENT (ventilation), and DEF (defrost) are formed (in FIG. 1, a blowing port 29 is illustrated as a representative). This blowing port 29 is provided with a blowing port switch dumper 31 that controls to switch the blowing of air from each port.

Moreover, the vehicle air conditioning device 1 includes a temperature control object temperature adjustment device 61 that adjusts the temperature of the battery 55 and the travel motor 65 by circulating a heat medium in the battery 55 and the travel motor 65. That is to say, the battery 55 and the travel motor 65 are the temperature control objects mounted in the vehicle in the example. Note that the travel motor 65 as the temperature control object is not limited to the electric motor itself and refers to concept including an electric device such as an inverter circuit for driving the motor.

The temperature control object temperature adjustment device 61 according to the example includes a circulation pump 62 as a circulation device for circulating the heat medium in the battery 55 and the travel motor 65, a first heat medium heater 66A and a second heat medium heater 66B as heating devices, and a refrigerant-heat medium heat exchanger 64. These elements, the battery 55, and the travel motor 65 are connected by a heat medium pipe 68.

In the case of this example, an inlet of a heat medium flow path 64A of the refrigerant-heat medium heat exchanger 64 is connected to a discharging side of the circulation pump 62, and an outlet of this heat medium flow path 64A is branched into a heat medium pipe 68A and a heat medium pipe 68B. To the heat medium pipe 68A, a serial circuit of a first solenoid valve 81, the first heat medium heater 66A, and the battery 55 as a flow path control device is connected. To the heat medium pipe 68B, a serial circuit of a second solenoid valve 82, the second heat medium heater 66B, and the travel motor 65 as the flow path control device is connected. After the heat medium pipe 68A on the outlet side of the battery 55 and the heat medium pipe 68A on the outlet side of the travel motor 65 merge, the merged pipe is connected to the suction side of the circulation pump 62. Note that each of the solenoid valves 81 and 82 may be formed by an electric valve capable of adjusting the flow rate.

Examples of the heat medium used in the temperature control object temperature adjustment device 61 include a refrigerant such as water or HFO-1234yf, liquid such as coolant, and gas such as air. Note that water is used as the heat medium in the example. The heat medium heaters 66A and 66B are each formed by an electric heater such as a PTC heater. Around the battery 55 and the travel motor 65, for example, a jacket structure in which the heat medium can flow by the heat exchange relation between the battery 55 and the travel motor 65 is formed.

When the circulation pump 62 is operated while the solenoid valves 81 and 82 are open, the heat medium discharged from the circulation pump 62 flows in the heat medium flow path 64A of the refrigerant-heat medium heat exchanger 64. The heat medium discharged from the heat medium flow path 64A of the refrigerant-heat medium heat exchanger 64 is branched. One of the branched heat mediums goes to the first heat medium heater 66A through the first solenoid valve 81 and in a case where the first heat medium heater 66A generates heat, the heat medium is heated there and goes to the battery 55, where the heat medium exchanges heat with the battery 55. The other of the branched heat mediums goes to the second heat medium heater 66B through the second solenoid valve 82 and in a case where the second heat medium heater 66B generates heat, the heat medium is heated there and goes to the travel motor 65, where the heat medium exchanges heat with the travel motor 65. After the heat mediums that have exchanged heat with the battery 55 and the travel motor 65 merge, the merged heat medium is sucked in the circulation pump 62 and thus, circulates in the heat medium pipe 68. When the first solenoid valve 81 is closed, the heat medium does not flow to the battery 55 and when the second solenoid valve 82 is closed, the heat medium does not flow to the travel motor 65.

On the other hand, the refrigerant pipe 13B positioned on the refrigerant upstream side of the indoor expansion valve 8 and on the refrigerant downstream side of the outlet of the refrigerant pipe 13F of the refrigerant circuit R, that is, the connection portion between the refrigerant pipe 13F and the refrigerant pipe 13B is connected to one end of a branch pipe 72 that is a branch circuit. This branched pipe 72 is provided with an auxiliary expansion valve 73 formed by an electric valve. This auxiliary expansion valve 73 can decompress and expand the refrigerant that flows in a refrigerant flow path 64B, which is described below, of the refrigerant-heat medium heat exchanger 64, and also be fully closed.

The other end of the branch pipe 72 is connected to the refrigerant flow path 64B of the refrigerant-heat medium heat exchanger 64. One end of a refrigerant pipe 74 is connected to the outlet of this refrigerant flow path 64B and the other end of the refrigerant pipe 74 is connected to the refrigerant pipe 13C on the refrigerant downstream side of the check valve 20 and before the accumulator 12 (refrigerant upstream side). These auxiliary expansion valve 73 and the like also constitute a part of the refrigerant circuit R, and at the same time constitute a part of the temperature control object temperature adjustment device 61.

In a case where the auxiliary expansion valve 73 is open, the refrigerant (part of the refrigerant or the entire refrigerant) coming from the refrigerant pipe 13F or the outdoor heat exchanger 7 flows in the branch pipe 72 and is decompressed in the auxiliary expansion valve 73. After that, the refrigerant flows in the refrigerant flow path 64B of the refrigerant-heat medium heat exchanger 64 and evaporates therefrom. The refrigerant absorbs heat from the heat medium flowing in the heat medium flow path 64A in the process of flowing in the refrigerant flow path 64B, and then is sucked into the compressor 2 through the accumulator 12.

Figure 2:
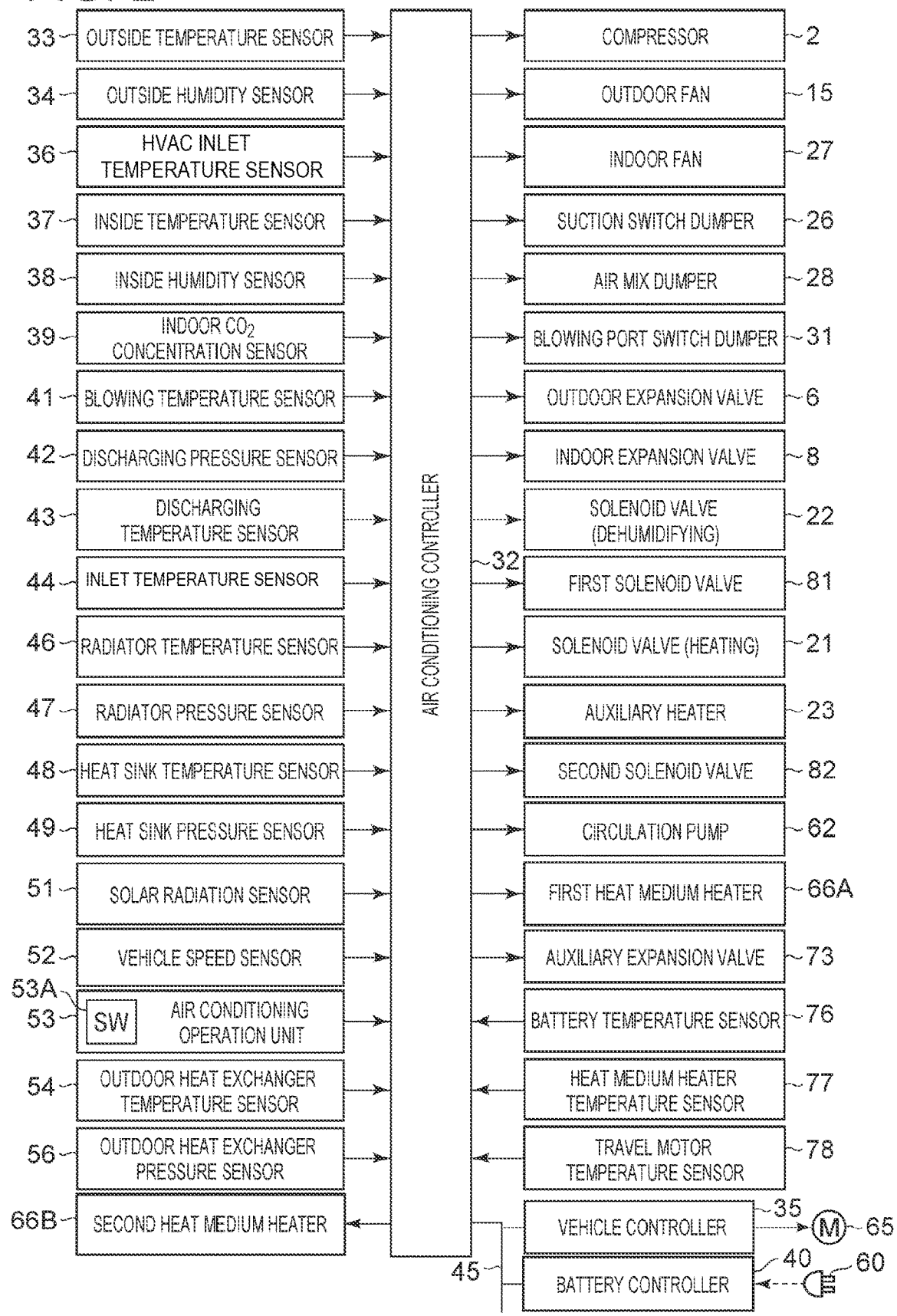
FIG. 2 is a block diagram of an air conditioning controller as a control device of the vehicle air conditioning device in FIG. 1.

Next, in FIG. 2, a reference numeral 32 denotes an air conditioning controller that serves as a control device that controls the vehicle air conditioning device 1. This air conditioning controller 32 is connected through a vehicle communication bus 45 to a vehicle controller 35 (ECU) that controls the entire vehicle including driving control for the travel motor 65, and to a battery controller 40 that controls charging and discharging of the battery 55, and transmits and receives information. The air conditioning controller 32, the vehicle controller 35 (ECU), and the battery controller 40 are each formed by a microcomputer as one example of a computer including a processor.

To an input of the air conditioning controller 32 (control device), an output of each of the following elements is connected: an outside temperature sensor 33 that detects outside temperature (rain) outside the vehicle, an outside humidity sensor 34 that detects outside humidity (Ham) outside the vehicle, an HVAC inlet temperature sensor 36 that detects the temperature of air that is sucked from the suction port 25 to the air flow path 3, an inside temperature sensor 37 that detects the temperature of the air (internal air) inside the cabin, an inside humidity sensor 38 that detects the humidity of the air inside the cabin, an indoor $CO_2$ concentration sensor 39 that detects the carbon dioxide concentration inside the cabin, a blowing temperature sensor 41 that detects the temperature of the air blown from the blowing port 29 into the cabin, a discharging pressure sensor 42 that detects discharging refrigerant pressure (discharging pressure Pd) of the compressor 2, a discharging temperature sensor 43 that detects the discharging refrigerant temperature of the compressor 2, an inlet temperature sensor 44 that detects the sucking refrigerant temperature of the compressor 2, a radiator temperature sensor 46 that detects the temperature of the radiator 4 (the temperature of the air after the radiator 4 or the temperature of the radiator 4 itself: radiator temperature TCl), a radiator pressure sensor 47 that detects the refrigerant pressure of the radiator 4 (the pressure of the refrigerant inside the radiator 4 or right after the radiator 4: radiator pressure PCI), a heat sink temperature sensor 48 that detects the temperature of the heat sink 9 (the temperature of the air after the heat sink 9 or the temperature of the heat sink 9 itself: heat sink temperature Te), a heat sink pressure sensor 49 that detects the refrigerant pressure of the heat sink 9 (the pressure of the refrigerant inside the heat sink 9 or right after the heat sink 9), a solar radiation sensor 51 of, for example, a photosensor type that detects the amount of solar radiation into the cabin, a vehicle speed sensor 52 that detects the moving speed of the vehicle (vehicle speed), an air conditioning operation unit 53 that sets to switch the set temperature or air conditioning operation, an outdoor heat exchanger temperature sensor 54 that detects the temperature of the outdoor heat exchanger 7 (the temperature of the refrigerant right after the outdoor heat exchanger 7 or the temperature of the outdoor heat exchanger 7 itself: outdoor beat exchanger temperature TXO, which is the evaporating temperature of the refrigerant in the outdoor heat exchanger 7 when the outdoor heat exchanger 7 functions as an evaporator), and an outdoor heat exchanger pressure sensor 56 that detects the refrigerant pressure of the outdoor heat exchanger 7 (the pressure of the refrigerant inside the outdoor heat exchanger 7 or right after the outdoor heat exchanger 7). Note that in the present example, the air conditioning operation unit 53 includes a forcible defrosting switch 53A that is described below.

Moreover, to an input of the air conditioning controller 32, an output of each of the following elements is connected: a battery temperature sensor 76 that detects the temperature of the battery 55 (the temperature of the battery 55 itself, the temperature of the heat medium from the battery 55, or the temperature of the heat medium that enters the battery 55: battery temperature Tb), a heat medium heater temperature sensor 77 that detects the temperature of each of the first and second heat medium heaters 66A and 66B (actually, this sensor 77 is provided to each of the heat medium heaters 66A and 66B but here just one is described), and a travel motor temperature sensor 78 that detects the temperature of the travel motor 65 (the temperature of the travel motor 65 itself, the temperature of the heat medium from the travel motor 65, or the temperature of the heat medium that enters the travel motor 65: travel motor temperature Tm).

To an output of the air conditioning controller 32, the following elements are connected: the compressor 2, the outdoor fan 15, the indoor fan (blower fan) 27, the suction switch dumper 26, the air mix dumper 28, the blowing port switch dumper 31, the outdoor expansion valve 6, the indoor expansion valve 8, the solenoid valve 22 (dehumidifying), the solenoid valves of the solenoid valves 21 (heating), the auxiliary heater 23, the circulation pump 62, the first and second heat medium heaters 66A and 66B, the auxiliary expansion valve 73, and the first and second solenoid valves 81 and 82. Then, the air conditioning controller 32 controls these elements on the basis of the output from each sensor and the setting input through the air conditioning operation unit 53, or the information from the vehicle controller 35 or the battery controller 40.

The vehicle controller 35 is to control the entire operation including the travel of the vehicle (in the example, electric vehicle), and to the output of this vehicle controller 35, the aforementioned travel motor 65 is connected. Note that a charging plug 60 (described below) to be connected to the external power source such as a quick charger includes a contact point, and in a case where the plug 60 is connected to the external power source, the state of this contact point changes and the contact point information about this change is transmitted to the vehicle controller 35. From this contact point information, the vehicle controller 35 detects that the plug 60 is connected to the external power source, and transmits the information about this detection to the air conditioning controller 32 or the battery controller 40.

In addition, to the vehicle controller 35, weather forecast information from the outside and navigation information (such as positional information or route guidance information) from a navigation device (not illustrated) mounted in the vehicle are input, and these pieces of information are also transmitted to the air conditioning controller 32. In addition, history information about the driving state of the vehicle is accumulated in the vehicle controller 35. As for this history information, the history (travel distance, travel time) about how the vehicle has been driven in the past has been accumulated for, for example, one year in accordance with the information about the date (calendar), and the history information about the driving state of the vehicle is also transmitted to the air conditioning controller 32.

To the battery controller 40, the aforementioned plug 60, which is connected to the external power source in the charging, is connected. This battery controller 40 controls the charging of the battery 55 from the external power source or the discharging from the battery 55. The battery controller 40 according to the example controls the charging and discharging of the battery 55 on the basis of the information transmitted from the vehicle controller 35 or the air conditioning controller 32, and transmits the information about the residual charging amount in the battery 55, that is the residual energy quantity of the battery 55 to the vehicle controller 35 or the air conditioning controller 32.

With the above structure, the operation of the vehicle air conditioning device 1 according to the example is described. The air conditioning controller 32 (control device) performs air conditioning operation by switching the heating operation (air conditioning to heat the cabin), the dehumidifying and heating operation (also air conditioning to heat the cabin), the internal cycle operation, and the dehumidifying and cooling operation, and the cooling operation in the example. Additionally, the air conditioning controller 32 adjusts the temperature of the battery 55 (temperature control object) or the travel motor 65 (temperature control object) to be within a predetermined optimum temperature range in the example. First, each air conditioning operation of the refrigerant circuit R in the vehicle air conditioning device 1 during the driving of the vehicle is described.

(1) Heating Operation

Figure 3:
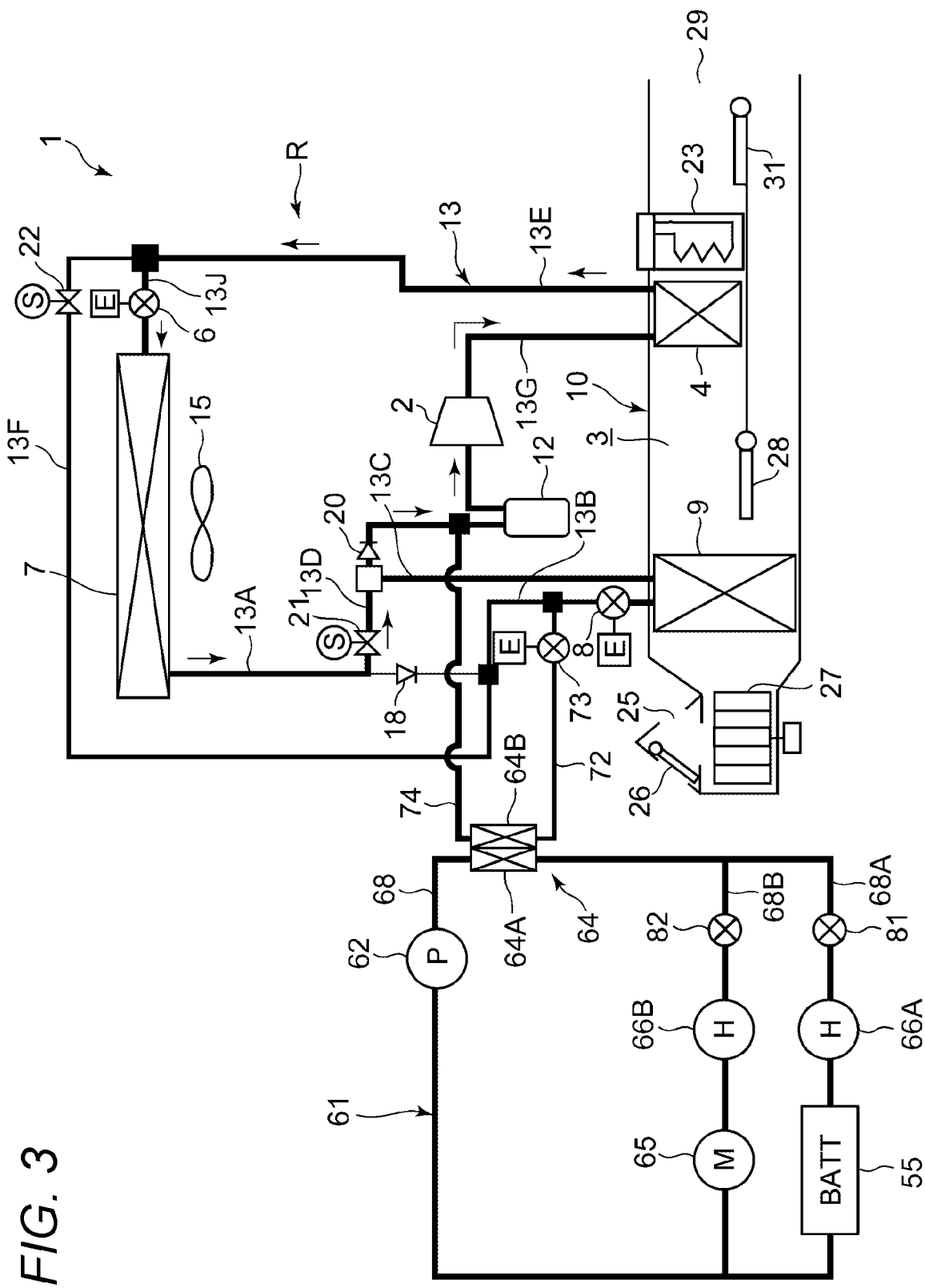
FIG. 3 is a diagram for describing heating operation by the air conditioning controller in FIG. 2.

First, the heating operation is described with reference to FIG. 3. FIG. 3 illustrates the flow (solid line arrow) of the refrigerant in the refrigerant circuit R in the heating operation. When the heating operation is selected by the air conditioning controller 32 (auto-mode) or by the manual operation in the air conditioning operation unit 53 (manual mode), the air conditioning controller 32 opens the solenoid valve 21 (for heating) and fully closes the indoor expansion valve 8. In addition, the solenoid valve 22 (for dehumidifying) is closed.

Then, the compressor 2 and the fans 15 and 27 are operated and the air mix dumper 28 adjusts the ratio of the air flowing to the radiator 4 and the auxiliary heater 23 to the air blown from the indoor fan 27. Thus, the gas refrigerant with high temperature and high pressure discharged from the compressor 2 flows in the radiator 4. Since the air in the air flow path 3 flows to the radiator 4, the air in the air flow path 3 is heated by the refrigerant with high temperature in the radiator 4, and on the other hand, the heat of the refrigerant in the radiator 4 is taken by the air and the refrigerant is cooled, and condensed to be liquid.

The refrigerant liquified in the radiator 4 flows out of the radiator 4 and then, flows to the outdoor expansion valve 6 through the refrigerant pipes 13E and 13J. The refrigerant having flowed to the outdoor expansion valve 6 is decompressed therein and then, flows into the outdoor heat exchanger 7. The refrigerant having flowed to the outdoor heat exchanger 7 evaporates and by traveling or from the external air supplied from the outdoor fan 15, the heat is pumped (heat absorption). That is to say, the refrigerant circuit R serves as a heat pump. Then, the refrigerant with low temperature from the outdoor heat exchanger 7 flows in the refrigerant pipe 13A, the refrigerant pipe 13D, and the solenoid valve 21, and from the refrigerant pipe 13C through the check valve 20, enters the accumulator 12 where the refrigerant is separated into gas and liquid. Then, the gas refrigerant is sucked in the compressor 2. This circulation is repeated. The air heated in the radiator 4 is blown from the blowing port 29, and thus, the cabin is heated.

The air conditioning controller 32 calculates a target radiator pressure PCO (target value of pressure PCI of radiator 4) from target heater temperature TCO (target value of air temperature on the lee side of the radiator 4) that is calculated based on target blowing temperature TAO, which is described below, controls the revolution speed of the compressor 2 on the basis of the target radiator pressure PCO and the refrigerant pressure of the radiator 4 that is detected by the radiator pressure sensor 47 (radiator pressure PCI, high pressure of refrigerant circuit R), controls the valve opening degree of the outdoor expansion valve 6 on the basis of the temperature of the radiator 4 that is detected by the radiator temperature sensor 46 (radiator temperature TCI) and the radiator pressure PCI detected by the radiator pressure sensor 47, and controls the supercooling degree of the refrigerant at the outlet of the radiator 4. The target heater temperature TCO is basically equal to TAO; however, a predetermined restriction is provided in point of control. If the heating capability by the radiator 4 is insufficient, electricity is supplied to the auxiliary heater 23 so that heat is generated and thus, the heating capability is assisted (compensated).

(2) Dehumidifying and Heating Operation

Figure 4:
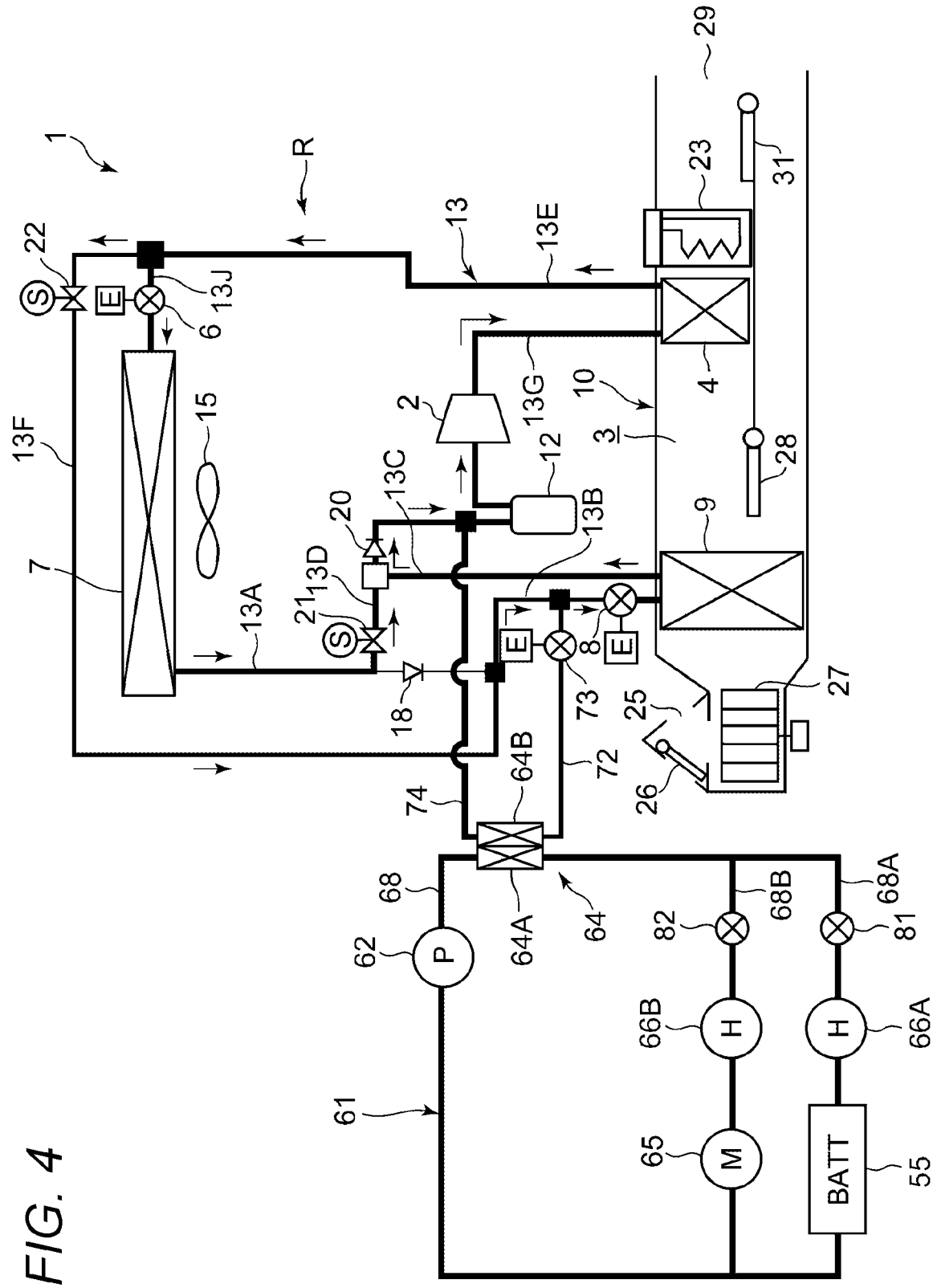
FIG. 4 is a diagram for describing dehumidifying and heating operation by the air conditioning controller in FIG. 2.

Next, the dehumidifying and heating operation as one of the dehumidifying operation is described with reference to FIG. 4. FIG. 4 illustrates the flow (solid line arrow) of the refrigerant in the refrigerant circuit R in the dehumidifying and heating operation. In the dehumidifying and heating operation, the air conditioning controller 32 opens the solenoid valve 22 and the indoor expansion valve 8 in the heating operation so that the refrigerant is decompressed and expanded. Thus, part of the condensed refrigerant flowing in the refrigerant pipe 13E through the radiator 4 is branched and the branched refrigerant flows to the refrigerant pipe 13F through the solenoid valve 22, and flows from the refrigerant pipe 13B to the indoor expansion valve 8 and the rest of the refrigerant flows to the outdoor expansion valve 6. That is to say, part of the refrigerant that is branched is decompressed in the indoor expansion valve 8 and flows to the heat sink 9, where the refrigerant evaporates.

The air conditioning controller 32 controls the valve opening degree of the indoor expansion valve 8 so as to maintain the superheating degree (SH) of the refrigerant at the outlet of the heat sink 9 to be a predetermined value, and in this case, the moisture in the air that is blown from the indoor fan 27 is condensed in the heat sink 9 by the heat absorption operation of the refrigerant generated in the heat sink 9 and adheres; thus, the air is cooled and dehumidified. The rest of the refrigerant having flowed to the refrigerant pipe 13J after the branch is decompressed in the outdoor expansion valve 6 and then, evaporates in the outdoor heat exchanger 7.

The refrigerant evaporating in the heat sink 9 goes to the refrigerant pipe 13C and merges with the refrigerant from the refrigerant pipe 13D (the refrigerant from the outdoor heat exchanger 7), and then, flows through the check valve 20 and the accumulator 12 and then is sucked into the compressor 2; this circulation is repeated. The air dehumidified in the heat sink 9 is heated again in the process of passing the radiator 4; thus, the cabin is dehumidified and heated.

The air conditioning controller 32 controls the revolution speed of the compressor 2 on the basis of the target radiator pressure PCO calculated from the target heater temperature TCO and the radiator pressure PCI detected by the radiator pressure sensor 47 (high pressure in refrigerant circuit R), and controls the valve opening degree of the outdoor expansion valve 6 on the basis of the temperature of the heat sink 9 detected by the heat sink temperature sensor 48 (heat sink temperature Te).

(3) Internal Cycle Operation

Figure 5:
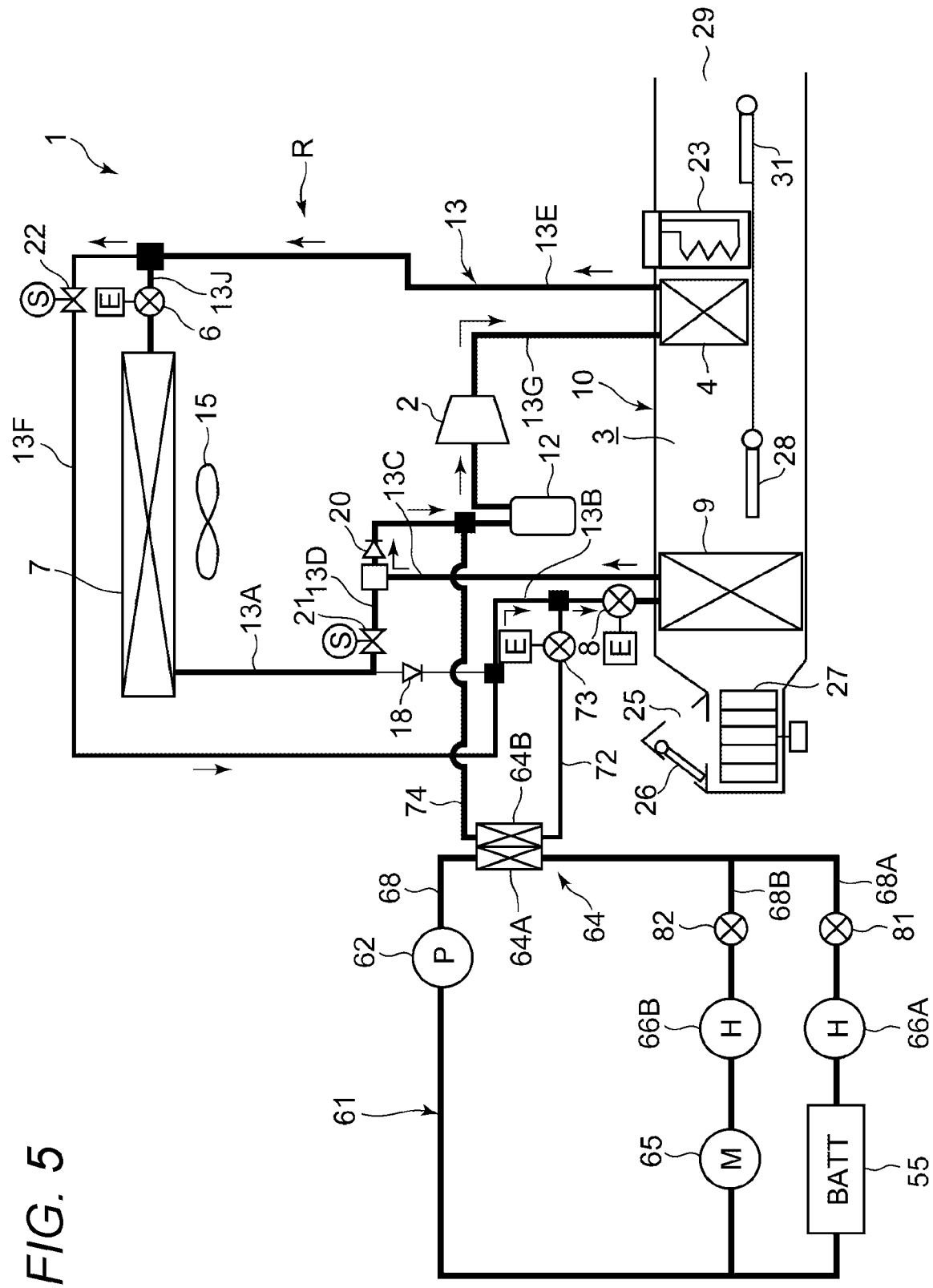
FIG. 5 is a diagram for describing internal cycle operation by the air conditioning controller in FIG. 2.

Next, the internal cycle operation as one of the dehumidifying operation is described with reference to FIG. 5. FIG. 5 illustrates the flow (solid line arrow) of the refrigerant in the refrigerant circuit R in the internal cycle operation. In the internal cycle operation, the air conditioning controller 32 fully closes the outdoor expansion valve 6 in the aforementioned dehumidifying and heating operation (fully closed position). However, the solenoid valve 21 keeps open and the refrigerant outlet of the outdoor heat exchanger 7 remains communicating with the refrigerant sucking side of the compressor 2. That is to say, this internal cycle operation is performed while the outdoor expansion valve 6 is fully closed by the control of the outdoor expansion valve 6 in the dehumidifying and heating operation; thus, this internal cycle operation can also be regarded as part of the dehumidifying and heating operation.

However, closing the outdoor expansion valve 6 interrupts the flow of the refrigerant into the outdoor heat exchanger 7; therefore, the condensed refrigerant flowing in the refrigerant pipe 13E through the radiator 4 entirely flows to the refrigerant pipe 13F through the solenoid valve 22. Then, the refrigerant flowing in the refrigerant pipe 13F flows to the indoor expansion valve 8 through the refrigerant pipe 13B. After the refrigerant is decompressed at the indoor expansion valve 8, the refrigerant flows in the heat sink 9 and evaporates. The moisture in the air blown from the indoor fan 27 at this time is condensed and adheres to the heat sink 9 by the heat absorption operation; therefore, the air is cooled and dehumidified.

The refrigerant evaporating in the heat sink 9 flows in the refrigerant pipe 13C, and is sucked in the compressor 2 through the check valve 20 and the accumulator 12, and this circulation is repeated. The air dehumidified in the heat sink 9 is heated again in the process of passing the radiator 4; thus, the cabin is dehumidified and heated. In this internal cycle operation, the refrigerant circulates between the radiator 4 (radiation) and the heat sink 9 (heat absorption) in the air flow path 3 inside the cabin, and therefore, the heat is not pumped from the external air and the heating capability for the consumed motive power of the compressor 2 is obtained. Since the entire refrigerant flows to the heat sink 9 that performs the dehumidifying operation, the dehumidifying capability is higher but the heating capability is lower than that in the dehumidifying and heating operation.

Although the outdoor expansion valve 6 is closed, the solenoid valve 21 is open and the refrigerant outlet of the of the outdoor heat exchanger 7 communicates with the refrigerant suction side of the compressor 2; thus, the liquid refrigerant in the outdoor heat exchanger 7 flows out to the refrigerant pipe 13C through the refrigerant pipe 13D and the solenoid valve 21, is collected in the accumulator 12, and the refrigerant exists as gas in the outdoor heat exchanger 7. Thus, as compared to when the solenoid valve 21 is closed, the amount of refrigerant circulating in the refrigerant circuit R increases and the heating capability of the radiator 4 and the dehumidifying capability of the heat sink 9 can be improved.

The air conditioning controller 32 controls the revolution speed of the compressor 2 on the basis of the temperature of the heat sink 9 or the aforementioned radiator pressure PCI (high pressure in refrigerant circuit R). Here, the air conditioning controller 32 controls the compressor 2 by selecting the lower target revolution speed of the compressor obtained by any of the calculations based on the temperature of the heat sink 9 and the radiator pressure PCI.

(4) Dehumidifying and Cooling Operation

Figure 6:
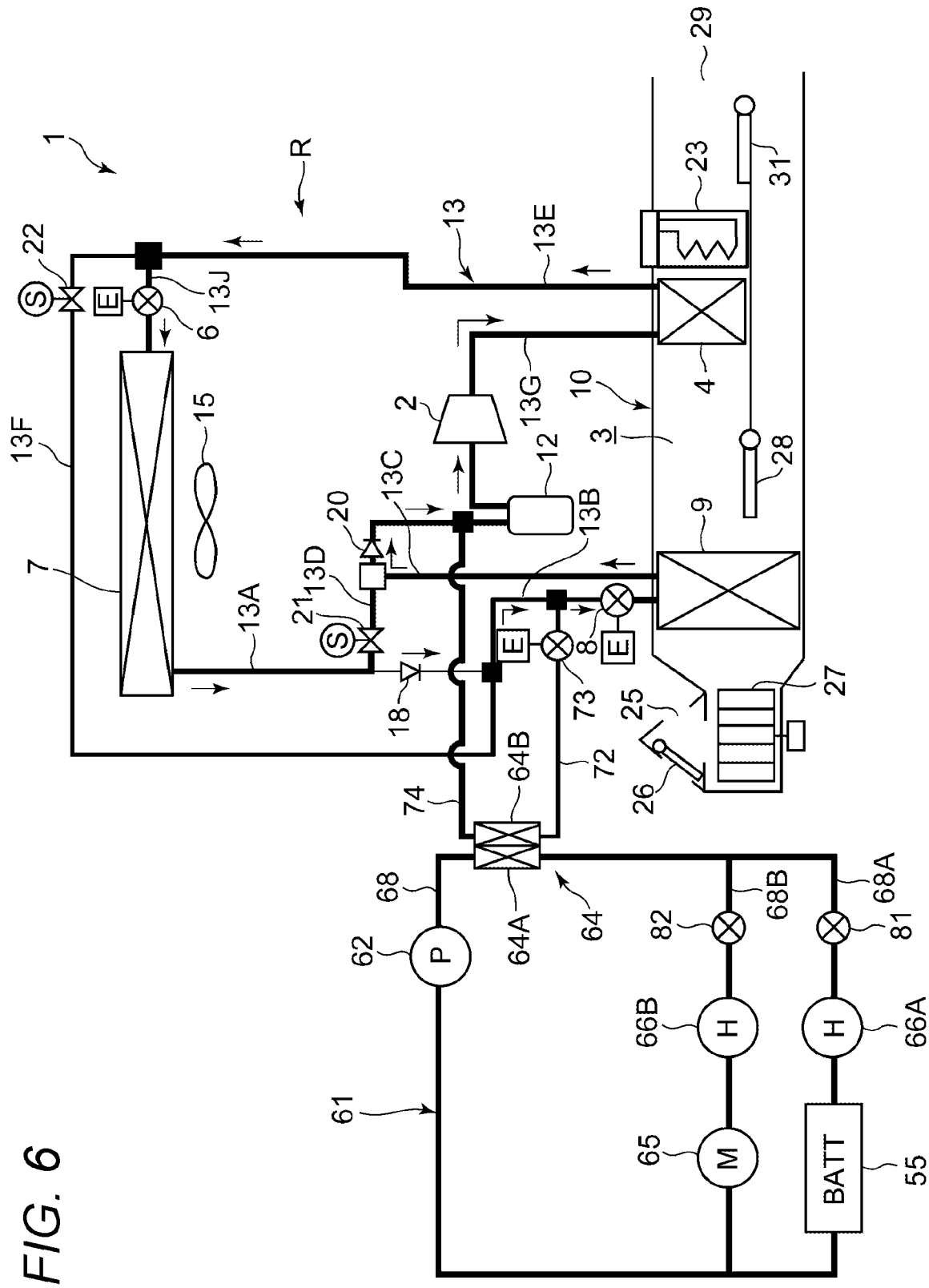
FIG. 6 is a diagram for describing dehumidifying and cooling operation/cooling operation by the air conditioning controller in FIG. 2.

Next, the dehumidifying and cooling operation as one of the dehumidifying operation is described with reference to FIG. 6. FIG. 6 illustrates the flow (solid line arrow) of the refrigerant in the refrigerant circuit R in the dehumidifying and cooling operation. In the dehumidifying and cooling operation, the air conditioning controller 32 opens the indoor expansion valve 8 and decompresses and expands the refrigerant, and closes the solenoid valve 21 and the solenoid valve 22. Then, the compressor 2, and the fans 15 and 27 are operated to produce the state in which the ratio of the air that flows to the radiator 4 and the auxiliary heater 23 to the air blown from the indoor fan 27 is adjusted by the air mix dumper 28. Thus, the gas refrigerant with high temperature and high pressure discharged from the compressor 2 flows into the radiator 4. To the radiator 4, the air in the air flow path 3 is supplied, and thus the air in the air flow path 3 is heated by the refrigerant with high temperature in the radiator 4 and on the other hand, the heat of the refrigerant in the radiator 4 is taken by the air, so that the refrigerant is cooled and condensed to be liquid.

The refrigerant from the radiator 4 flows to the outdoor expansion valve 6 through the refrigerant pipe 13E, and through the outdoor expansion valve 6 that is controlled to be a little open, flows to the outdoor heat exchanger 7. The refrigerant having flowed to the outdoor heat exchanger 7 is air-cooled by traveling or by external air supplied by the outdoor fan 15, so that the refrigerant is condensed. The refrigerant from the outdoor heat exchanger 7 enters the refrigerant pipe 13B through the refrigerant pipe 13A and the check valve 18, and then enters the indoor expansion valve 8. After the refrigerant is decompressed at the indoor expansion valve 8, the refrigerant flows in the heat sink 9 and evaporates. Due to the heat absorption operation, the moisture in the air blown from the indoor fan 27 is condensed and adheres to the heat sink 9; thus, the air is cooled and dehumidified.

The refrigerant evaporating in the heat sink 9 goes to the accumulator 12 through the refrigerant pipe 13C and the check valve 20, and then is sucked in the compressor 2; this circulation is repeated. The air cooled and dehumidified in the heat sink 9 is reheated (reheat: radiating capability is lower than at heating) in the process of passing the radiator 4; therefore, the cabin is dehumidified and cooled.

On the basis of the temperature of the heat sink 9 (heat sink temperature Te) detected by the heat sink temperature sensor 48 and the target value, the target heat sink temperature TEO, the air conditioning controller 32 controls the revolution speed of the compressor 2 so that the heat sink temperature Te becomes the target heat sink temperature TEO. Moreover, on the basis of the radiator pressure PCI (high pressure in refrigerant circuit R) detected by the radiator pressure sensor 47 and the target radiator pressure PCO calculated from the target heater temperature TCO (target value of radiator pressure PCI), the air conditioning controller 32 controls the valve opening degree of the outdoor expansion valve 6 so that the radiator pressure PCI becomes the target radiator pressure PCO. Thus, the necessary reheating quantity by the radiator 4 is obtained.

(5) Cooling Operation

Next, the cooling operation is described. The flow in the refrigerant circuit R is similar to that in the dehumidifying and cooling operation in FIG. 6. In the cooling operation, the air conditioning controller 32 maximizes the valve opening degree of the outdoor expansion valve 6 in the aforementioned dehumidifying and cooling operation. Note that the air mix dumper 28 is in the state of adjusting the ratio of supplying the air to the radiator 4 and the auxiliary heater 23.

Thus, the gas refrigerant with high temperature and high pressure discharged from the compressor 2 flows in the radiator 4. Although the air in the air flow path 3 flows in the radiator 4, the ratio is small (because it is only reheating in the cooling) and therefore, here, the air just passes and the refrigerant exiting from the radiator 4 flows to the outdoor expansion valve 6 through the refrigerant pipe 13E. Since the outdoor expansion valve 6 here is fully open, the refrigerant continuously passes the refrigerant pipe 13J through the outdoor expansion valve 6, flows in the outdoor heat exchanger 7, and by the traveling or by the external air supplied by the outdoor fan 15, the refrigerant is air-cooled and condensed to be liquid. The refrigerant exiting from the outdoor heat exchanger 7 enters the refrigerant pipe 13A, enters the refrigerant pipe 13B through the check valve 18, and then enters the indoor expansion valve 8. After the refrigerant is decompressed at the indoor expansion valve 8, the refrigerant flows in the heat sink 9 and evaporates. By the heat absorption operation here, the moisture in the air blown from the indoor fan 27 is condensed and adheres to the heat sink 9, and thus the air is cooled.

The refrigerant evaporating in the heat sink 9 reaches the accumulator 12 through the refrigerant pipe 13C and the check valve 20, and then is sucked in the compressor 2; this circulation is repeated. The air cooled and dehumidified in the heat sink 9 is blown into the cabin from the blowing port 29; thus, the cabin is cooled. In this cooling operation, the air conditioning controller 32 controls the revolution speed of the compressor 2 on the basis of the temperature of the heat sink 9 detected by the heat sink temperature sensor 48 (heat sink temperature Te).

(6) Switching of Air Conditioning Operation

The air conditioning controller 32 calculates the target blowing temperature TAO described above from the following Expression (I). This target blowing temperature TAO is the target value of the temperature of the air blown from the blowing port 29 into the cabin.

$$TAO=(Tset-Tin) \times K+Tbal(f(Tset,SUN,Tam)) \quad (I)$$

Here, Tset represents the set temperature in the cabin, which is set by the air conditioning operation unit 53, Tin represents the temperature of the air in the cabin detected by the inside temperature sensor 37, K represents a constant, and Tbal represents a balance value calculated from the set temperature Tset, the amount of solar radiation SUN detected by the solar radiation sensor 51, and the outside temperature Tam detected by the outside temperature sensor 33. Generally, the target blowing temperature TAO is higher as the outside temperature Tam is lower, and lower as the outside temperature Tam is higher.

Then, at the start, the air conditioning controller 32 selects any of the aforementioned kinds of air conditioning operation on the basis of the outside temperature Tam detected by the outside temperature sensor 33 and the target blowing temperature TAO. After the start, the air conditioning controller 32 selects and switches the air conditioning in accordance with the change of the setting condition or the environment such as the outside temperature Tam or the target blowing temperature TAO.

(7) Temperature Adjustment of Temperature Control Object (Battery 55 and Travel Motor 65)

Next, the temperature adjustment control of the battery 55 and the travel motor 65 (temperature control objects) by the air conditioning controller 32 in the air conditioning operation is described with reference to FIG. 7 to FIG. 10. Here, the battery 55 changes in temperature depending on the outside temperature and also changes in temperature due to heat generation from itself. When the outside temperature is high or extremely low, the temperature of the battery 55 becomes extremely high or extremely low and in this case, charging and discharging become difficult. In addition, the temperature of the travel motor 65 may similarly become extremely high or extremely low depending on the driving or environment condition and in this case, the travel motor 65 may fail to function properly and a trouble may occur.

In view of this, the air conditioning controller 32 in the vehicle air conditioning device 1 according to the example causes the temperature control object temperature adjustment device 61 to adjust the temperature of each of the battery 55 and the travel motor 65 to be in the predetermined optimum temperature range (usable temperature range) while performing the air conditioning operation as described above. The optimum temperature range of each of the battery 55 and the travel motor 65 is the generally known range and in the present application, for example, the optimum temperature range of the battery 55 is 0° C. or more and +40° C. or less. That is to say, a predetermined lower limit value TL of the optimum temperature range is 0° C. and a predetermined upper limit value TH thereof is +40° C. Note that the optimum temperature range of the travel motor 65 is different from that of the battery 55, and in the present application, for example, the optimum temperature range of the travel motor 65 is −15° C. or more and +60° C. or less and the predetermined lower limit value (−15° C.) of the optimum temperature range is expressed as TL and the upper limit value (+60° C.) of the optimum temperature range is expressed as TH.

(7-1) Heating/Temperature Control Object Temperature Adjustment Mode

Figure 7:
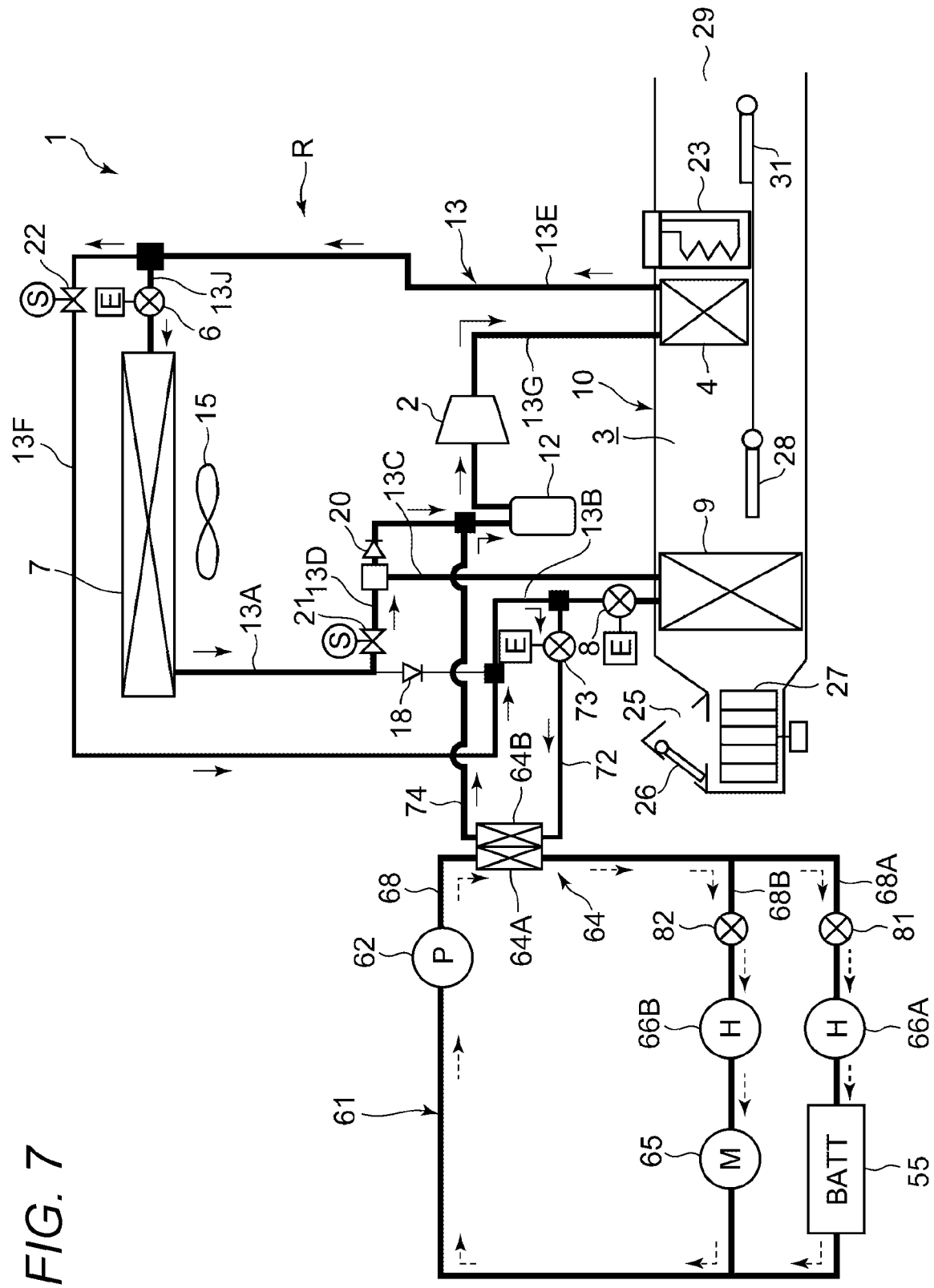
FIG. 7 is a diagram for describing heating/temperature control object temperature adjustment mode by the air conditioning controller in FIG. 2.

The air conditioning controller 32 performs the heating/temperature control object temperature adjustment mode in a case where any of the battery temperature Tb and the travel motor temperature Tm detected by the battery temperature sensor 76 and the travel motor temperature sensor 78 in the aforementioned heating operation deviates from the optimum temperature range and it is necessary to adjust the temperature of the battery 55 or the travel motor 65. FIG. 7 illustrates the flow (solid line arrow) of the refrigerant in the refrigerant circuit R and the flow (broken line arrow) of the heat medium in the temperature control object temperature adjustment device 61 in the heating/temperature control object temperature adjustment mode.

In this heating/temperature control object temperature adjustment mode, the air conditioning controller 32 further opens the solenoid valve 22 in the state of the heating operation of the refrigerant circuit R illustrated in FIG. 3 and moreover opens the auxiliary expansion valve 73 and controls the valve opening degree thereof. Then, the circulation pump 62 of the temperature control object temperature adjustment device 61 is operated. Thus, part of the refrigerant from the radiator 4 is branched on the refrigerant upstream side of the outdoor expansion valve 6, and flows to the refrigerant upstream side of the indoor expansion valve 8 through the refrigerant pipe 13F. The refrigerant then enters the branch pipe 72, and is decompressed at the auxiliary expansion valve 73. After that, the refrigerant flows to the refrigerant flow path 64B of the refrigerant-heat medium heat exchanger 64 through the branch pipe 72 and evaporates. Here, the heat absorption operation is obtained. The refrigerant evaporating in this refrigerant flow path 64B flows through the refrigerant pipe 74, the refrigerant pipe 13C, and the accumulator 12 sequentially and is sucked in the compressor 2; this circulation is repeated (indicated by solid line arrow in FIG. 7).

On the other hand, the heat medium discharged from the circulation pump 62 flows in the heat medium pipe 68 to the heat medium flow path 64A of the refrigerant-heat medium heat exchanger 64, and the heat thereof is absorbed by the refrigerant evaporating in the refrigerant flow path 64B and thus, the heat medium is cooled. The heat medium exiting from the heat medium flow path 64A of the refrigerant-heat medium heat exchanger 64 is branched with the first and second solenoid valves 81 and 82 open, and one branched heat medium flows to the first heat medium heater 66A through the first solenoid valve 81 and is heated therein (in the case where the first heat medium heater 66A generates heat), and then, the heat medium flows to the battery 55 where the heat medium exchanges heat with the battery 55. The other branched heat medium flows to the second heat medium heater 66B through the second solenoid valve 82 and is heated therein (in the case where the second heat medium heater 66B generates heat), and then, the heat medium flows to the travel motor 65 where the heat medium exchanges heat with the travel motor 65. The heat mediums having exchanged heat with the battery 55 and the travel motor 65 merge and then, the merged heat medium is sucked in the circulation pump 62; this circulation is repeated (indicated by a broken line arrow in FIG. 7).

For example, while regularly supplying the refrigerant to the refrigerant flow path 64B of the refrigerant-heat medium heat exchanger 64 and regularly cooling the heat medium, the air conditioning controller 32 controls the heat generation of the heat medium heaters 66A and 66B and the opening and closing of the solenoid valves 81 and 82 on the basis of the battery temperature Tb detected by the battery temperature sensor 76, the travel motor temperature Tm detected by the travel motor temperature sensor 78, and the upper limit value TH and the lower limit value TL of these optimum temperature ranges so that the battery temperature Tb is in the optimum temperature range and the travel motor temperature Tm is also in the optimum temperature range (in this case, actually, the heating/temperature control object temperature adjustment mode is regularly performed instead of the heating operation, or the heating operation and the heating/temperature control object temperature adjustment mode are performed so as to switch between them).

For example, in a case where the battery temperature Tb is higher than the upper limit value TH of the optimum temperature range, the air conditioning controller 32 opens the first solenoid valve 81 and causes the first heat medium heater 66A not to generate heat, thereby cooling the battery 55; on the other hand, in a case where the battery temperature Tb is lower than the lower limit value TL of the optimum temperature range, the air conditioning controller 32 opens the first solenoid valve 81 and causes the first heat medium heater 66A to generate heat, thereby heating the battery 55.

Moreover, in a case where the travel motor temperature Tm is higher than the upper limit value TH of the optimum temperature range, the air conditioning controller 32 opens the second solenoid valve 82 and causes the second heat medium heater 66B not to generate heat, thereby cooling the travel motor 65; on the other hand, in a case where the travel motor temperature Tm is lower than the lower limit value TL of the optimum temperature range, the air conditioning controller 32 opens the second solenoid valve 82 and causes the second heat medium heater 66B to generate heat, thereby heating the travel motor 65. Thus, by adjusting the temperature of the battery 55 detected by the battery temperature sensor 76 (battery temperature Tb) and the temperature of the travel motor 65 detected by the travel motor temperature sensor 78 (travel motor temperature Tm) to be in the respective optimum temperature ranges, the battery temperature Tb and the travel motor temperature Tm are independently controlled.

Note that one of the solenoid valves 81 and 82 of the battery 55 and the travel motor 65 that does not require the temperature adjustment is closed and the corresponding heat medium heater 66A or 66B does not generate heat. In addition, also in the case where the heat medium is supplied to both the battery temperature Tb and the travel motor temperature Tm by the aforementioned control, the capabilities of the refrigerant-heat medium heat exchanger 64 and the heat medium heaters 66A and 66B are set to the values that can make those in the respective optimum temperature ranges on the basis of the heat capacity of the battery 55 or the travel motor 65 as the load. Thus, the air conditioning controller 32 controls independently the temperature Tb of the battery 55 and the temperature Tm of the travel motor 65 so as to be in the respective optimum temperature ranges.

(7-2) Cooling/Temperature Control Object Temperature Adjustment Mode

Figure 8:
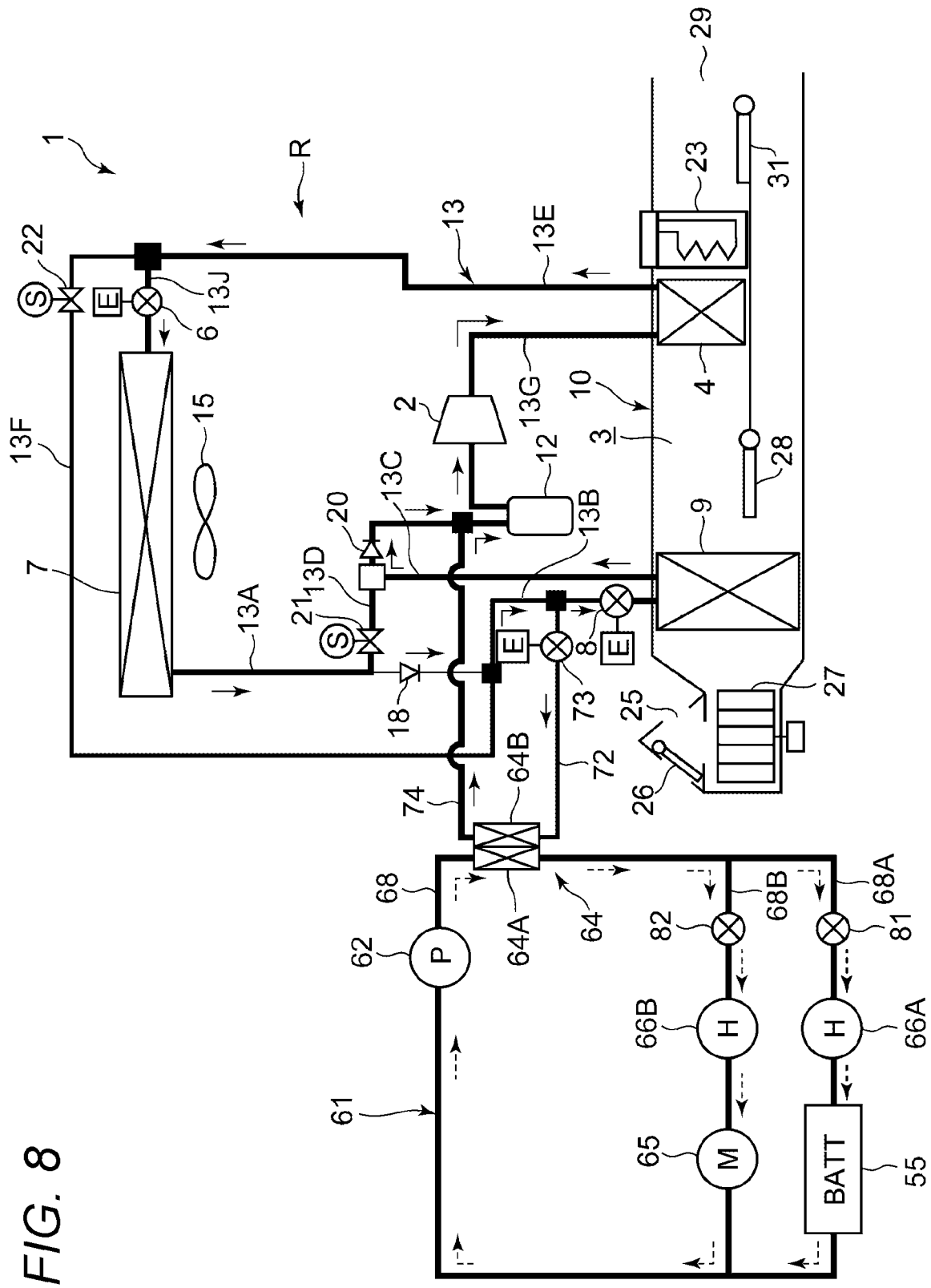
FIG. 8 is a diagram for describing dehumidifying and cooling/temperature control object temperature adjustment mode (cooling/temperature control object temperature adjustment mode) by the air conditioning controller in FIG. 2.

Next, in the case where it becomes necessary to adjust the temperature of the battery 55 or the travel motor 65 in the aforementioned cooling operation, the air conditioning controller 32 performs the cooling/temperature control object temperature adjustment mode. FIG. 8 illustrates the flow (solid line arrow) of the refrigerant in the refrigerant circuit R and the flow (broken line arrow) of the heat medium in the temperature control object temperature adjustment device 61 in the cooling/temperature control object temperature adjustment mode.

In this cooling/temperature control object temperature adjustment mode, the air conditioning controller 32 opens the auxiliary expansion valve 73 and controls the valve opening degree thereof in the state of the refrigerant circuit R in the cooling operation described above in FIG. 6, and also operates the circulation pump 62 of the temperature control object temperature adjustment device 61 so that the heat is exchanged between the refrigerant and the heat medium in the refrigerant-heat medium heat exchanger 64.

Thus, the refrigerant with high temperature discharged from the compressor 2 flows in the outdoor heat exchanger 7 through the radiator 4, and exchanges heat with the travel wind or the external air supplied by the outdoor fan 15 and accordingly, the refrigerant radiates heat and condenses. Part of the refrigerant condensed in the outdoor heat exchanger 7 flows to the indoor expansion valve 8 where the refrigerant is decompressed. Then, the refrigerant flows in the heat sink 9 and evaporates. The air in the air flow path 3 is cooled by the heat absorption operation and thus, the cabin is cooled.

The rest of the refrigerant condensed in the outdoor heat exchanger 7 is branched to the branch pipe 72, and is decompressed at the auxiliary expansion valve 73. After that, the refrigerant evaporates in the refrigerant flow path 64B of the refrigerant-heat medium heat exchanger 64. The refrigerant absorbs the heat from the heat medium circulating in the temperature control object temperature adjustment device 61, and thus, the battery 55 and the travel motor 65 are cooled as described above. Note that the refrigerant exiting from the heat sink 9 is sucked in the compressor 2 through the refrigerant pipe 13C, the check valve 20, and the accumulator 12, and the refrigerant exiting from the refrigerant-heat medium heat exchanger 64 is also sucked in the compressor 2 from the refrigerant pipe 74 through the accumulator 12.

Moreover, in this cooling/temperature control object temperature adjustment mode, the air conditioning controller 32 controls the auxiliary expansion valve 73, the heat medium heaters 66A and 66B, and the solenoid valves 81 and 82 by using the cooling/temperature control object temperature adjustment mode instead of the cooling operation, switching between the cooling operation and the cooling/temperature control object temperature adjustment mode, or shifting from the cooling operation to the cooling/temperature control object temperature adjustment mode in a manner similar to the heating/temperature control object temperature adjustment mode described above. Thus, the temperature of the battery 55 (battery temperature Tb) and the temperature of the travel motor 65 (travel motor temperature Tm) are adjusted (controlled) to be in the respective optimum temperature ranges.

(7-3) Dehumidifying and Cooling/Temperature Control Object Temperature Adjustment Mode Next, in a case where it becomes necessary to adjust the temperature of the battery 55 or the travel motor 65 during the dehumidifying and cooling operation, the air conditioning controller 32 performs the dehumidifying and cooling/temperature control object temperature adjustment mode. Note that the flow (solid line arrow) of the refrigerant in the refrigerant circuit R in the dehumidifying and cooling/temperature control object temperature adjustment mode and the flow (broken line arrow) of the heat medium in the temperature control object temperature adjustment device 61 in the dehumidifying and cooling/temperature control object temperature adjustment mode are similar to those in FIG. 8; however, the outdoor expansion valve 6 is not fully opened but is a little open. Moreover, in a manner similar to the cooling/temperature control object temperature adjustment mode, the air conditioning controller 32 controls the auxiliary expansion valve 73, the heat medium heaters 66A and 66B, and the solenoid valves 81 and 82 by using the dehumidifying and cooling/temperature control object temperature adjustment mode instead of the dehumidifying and cooling operation, switching between the dehumidifying and cooling operation and the dehumidifying and cooling/temperature control object temperature adjustment mode, or shifting from the dehumidifying and cooling operation to the dehumidifying and cooling/temperature control object temperature adjustment mode. Thus, the battery temperature Tb and the travel motor temperature Tm are adjusted (controlled) to be in the respective optimum temperature ranges.

(7-4) Internal Cycle/Temperature Control Object Temperature Adjustment Mode

Figure 9:
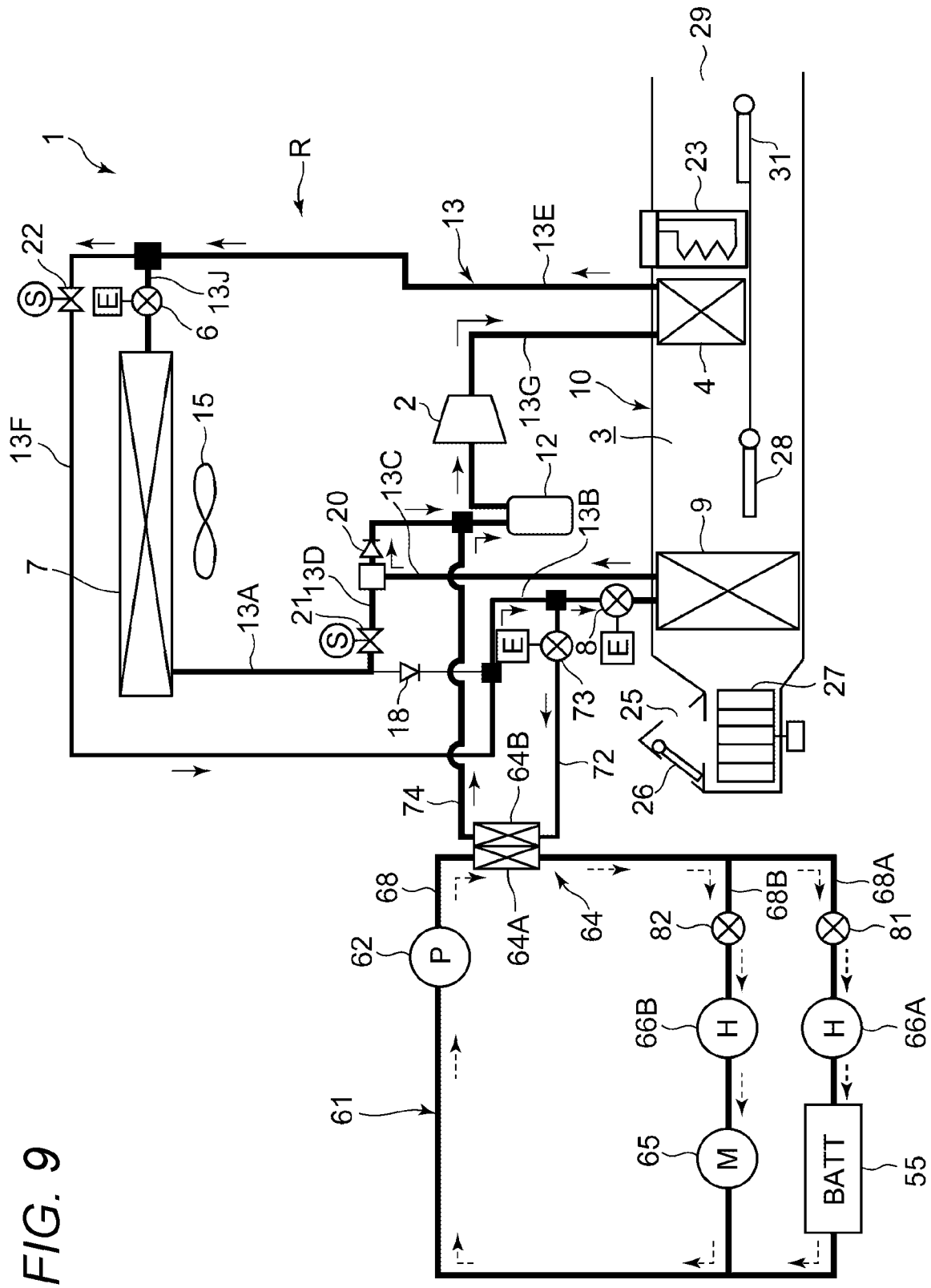
FIG. 9 is a diagram for describing internal cycle/temperature control object temperature adjustment mode by the air conditioning controller in FIG. 2.

Next, in a case where it becomes necessary to adjust the temperature of the battery 55 or the travel motor 65 in the aforementioned internal cycle operation, the air conditioning controller 32 performs the internal cycle/temperature control object temperature adjustment mode. In this internal cycle/temperature control object temperature adjustment mode, the air conditioning controller 32 opens the auxiliary expansion valve 73 and controls the valve opening degree thereof in the state of the refrigerant circuit R in the internal cycle operation described above in FIG. 5, and also operates the circulation pump 62 of the temperature control object temperature adjustment device 61 so that the heat is exchanged between the refrigerant and the heat medium in the refrigerant-heat medium heat exchanger 64. FIG. 9 illustrates the flow (solid line arrow) of the refrigerant in the refrigerant circuit R and the flow (broken line arrow) of the heat medium in the temperature control object temperature adjustment device 61 in the internal cycle/temperature control object temperature adjustment mode.

Thus, after the refrigerant with high temperature discharged from the compressor 2 radiates heat in the radiator 4, the refrigerant entirely flows to the refrigerant pipe 13F through the solenoid valve 22. Then, part of the refrigerant exiting from the refrigerant pipe 13F flows to the indoor expansion valve 8 through the refrigerant pipe 13B, and is decompressed therein, and then the refrigerant flows in the heat sink 9 and evaporates. By the heat absorption operation here, the moisture in the air blown from the indoor fan 27 is condensed and adheres to the heat sink 9; thus, the air is cooled and dehumidified.

The rest of the refrigerant exiting from the refrigerant pipe 13F is branched to the branch pipe 72, and is decompressed at the auxiliary expansion valve 73. After that, the refrigerant evaporates in the refrigerant flow path 64B of the refrigerant-heat medium heat exchanger 64. The refrigerant absorbs the heat from the heat medium circulating in the temperature control object temperature adjustment device 61, and thus, the battery 55 and the travel motor 65 are cooled as described above. Note that the refrigerant exiting from the heat sink 9 is sucked in the compressor 2 through the refrigerant pipe 13C, the check valve 20, and the accumulator 12, and the refrigerant exiting from the refrigerant-heat medium heat exchanger 64 is also sucked in the compressor 2 from the refrigerant pipe 74 through the accumulator 12.

Moreover, in the internal cycle/temperature control object temperature adjustment mode, in a manner similar to the heating/temperature control object temperature adjustment mode described above, the air conditioning controller 32 controls the auxiliary expansion valve 73, the heat medium heaters 66A and 66B, and the solenoid valves 81 and 82 by using the internal cycle/temperature control object temperature adjustment mode instead of the internal cycle operation, switching between the internal cycle operation and the internal cycle/temperature control object temperature adjustment mode, or shifting from the internal cycle operation to the internal cycle/temperature control object temperature adjustment mode. Thus, the battery temperature Tb and the travel motor temperature Tm are adjusted (controlled) to be in the respective optimum temperature ranges.

Figure 10:
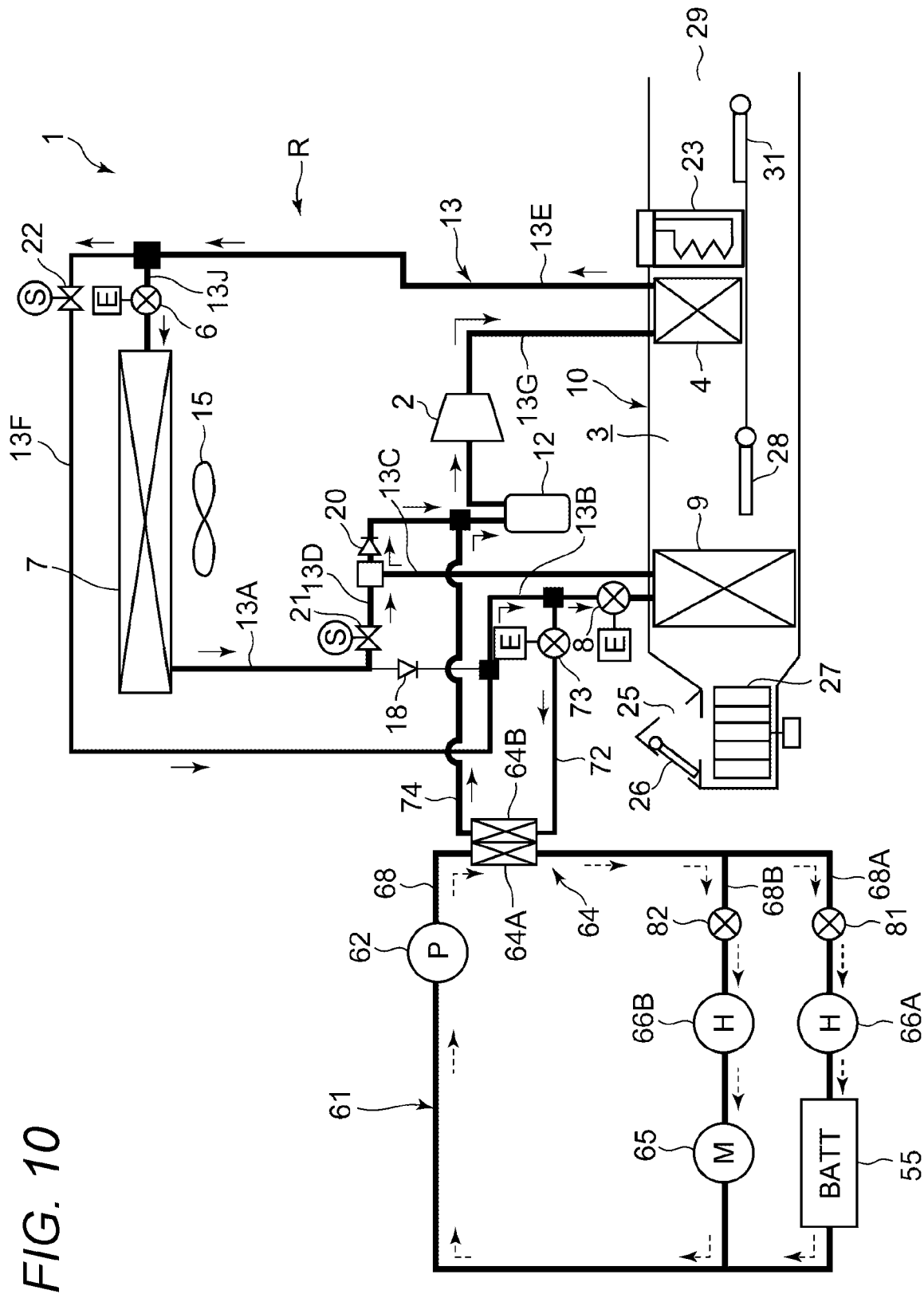
FIG. 10 is a diagram for describing dehumidifying and heating/temperature control object temperature adjustment mode by the air conditioning controller in FIG. 2.

(7-5) Dehumidifying and Heating/Temperature Control Object Temperature Adjustment Mode Next, in a case where it becomes necessary to adjust the temperature of the battery 55 or the travel motor 65 in the aforementioned dehumidifying and heating operation, the air conditioning controller 32 performs the dehumidifying and heating/temperature control object temperature adjustment mode. In this dehumidifying and heating/temperature control object temperature adjustment mode, the air conditioning controller 32 opens the auxiliary expansion valve 73 and controls the valve opening degree thereof in the state of the refrigerant circuit R in the dehumidifying and heating operation described above in FIG. 4, and also operates the circulation pump 62 of the temperature control object temperature adjustment device 61 so that the heat is exchanged between the refrigerant and the heat medium in the refrigerant-heat medium heat exchanger 64. FIG. 10 illustrates the flow (solid line arrow) of the refrigerant in the refrigerant circuit R and the flow (broken line arrow) of the heat medium in the temperature control object temperature adjustment device 61 in the dehumidifying and heating/temperature control object temperature adjustment mode.

Thus, part of the condensed refrigerant exiting from the radiator 4 is branched and the branched refrigerant flows to the refrigerant pipe 13F through the solenoid valve 22, and part of the refrigerant exiting from the refrigerant pipe 13F flows from the refrigerant pipe 13B to the indoor expansion valve 8 and the rest of the refrigerant flows to the outdoor expansion valve 6. That is to say, part of the branched refrigerant is decompressed at the indoor expansion valve 8, and then, the refrigerant flows in the heat sink 9 and evaporates. By the heat absorption operation in the heat sink 9 here, the moisture in the air blown from the indoor fan 27 is condensed and adheres to the heat sink 9; thus, the air is cooled and dehumidified. The air dehumidified in the heat sink 9 is heated again in the process of passing the radiator 4; thus, the cabin is dehumidified and heated. The rest of the condensed refrigerant exiting from the radiator 4 is decompressed at the outdoor expansion valve 6 and then evaporates in the outdoor heat exchanger 7, and the refrigerant absorbs heat from the external air.

On the other hand, the rest of the refrigerant exiting from the refrigerant pipe 13F flows into the branch pipe 72, and is decompressed at the auxiliary expansion valve 73. After that, the refrigerant evaporates in the refrigerant flow path 64B of the refrigerant-heat medium heat exchanger 64. The refrigerant absorbs the heat from the heat medium circulating in the temperature control object temperature adjustment device 61, and thus, the battery 55 and the travel motor 65 are cooled as described above. Note that the refrigerant exiting from the heat sink 9 is sucked in the compressor 2 through the refrigerant pipe 13C, the check valve 20, and the accumulator 12, and the refrigerant exiting from the outdoor heat exchanger 7 is sucked in the compressor 2 through the refrigerant pipe 13D, the solenoid valve 21, the refrigerant pipe 13C, the check valve 20, and the accumulator 12. The refrigerant exiting from the refrigerant-heat medium heat exchanger 64 is also sucked in the compressor 2 from the refrigerant pipe 74 through the accumulator 12.

In this dehumidifying and heating/temperature control object temperature adjustment mode, the air conditioning controller 32 also controls the auxiliary expansion valve 73, the heat medium heaters 66A and 66B, and the solenoid valves 81 and 82 by using the dehumidifying and heating/temperature control object temperature adjustment mode instead of the dehumidifying and heating operation, switching between the dehumidifying and heating operation and the dehumidifying and heating/temperature control object temperature adjustment mode, or shifting from the dehumidifying and heating operation to the dehumidifying and heating/temperature control object temperature adjustment mode in a manner similar to the aforementioned heating/temperature control object temperature adjustment mode. Thus, the battery temperature Tb and the travel motor temperature Tm are adjusted (controlled) to be in the respective optimum temperature ranges.

(8) Defrosting Operation of Outdoor Heat Exchanger 7

Next, the defrosting operation of the outdoor heat exchanger 7 by the air conditioning controller 32 is described. Since the outdoor heat exchanger 7 functions as an evaporator during the heating operation as described above, the moisture in the external air grows as frost in the outdoor heat exchanger 7 and the heat exchange efficiency gradually deteriorates. In view of this, in the example, the air conditioning controller 32 calculates outdoor heat exchanger temperature TXObase at the non-frosting time, on the basis of, for example, the outside temperature Tam or the revolution speed of the compressor 2. The air conditioning controller 32 regularly compares the outdoor heat exchanger temperature TXObase at the non-frosting time with the outdoor heat exchanger temperature TXO detected by the outdoor heat exchanger temperature sensor 54. If the outdoor heat exchanger temperature TXO becomes lower than the outdoor heat exchanger temperature TXObase and the difference becomes a predetermined value or more, it is determined that a predetermined amount of frost is generated in the outdoor heat exchanger 7 and the outdoor heat exchanger 7 needs to be defrosted.

If it is determined that the outdoor heat exchanger 7 needs to be defrosted as described above, the air conditioning controller 32 performs the defrosting operation basically while the plug 60 is connected to the external power source, so that the outdoor heat exchanger 7 is defrosted. Moreover, in this case, the air conditioning controller 32 defrosts the outdoor heat exchanger 7 also while the charging is not performed (while the vehicle stops or travels, or needless to say, during the air conditioning operation of the cabin). However, the air conditioning controller 32 determines whether it is possible to perform the defrosting operation while the charging is not performed on the basis of the outside humidity as described below. This determination is described in detail below.

(8-1) Defrosting Operation (No. 1)

Figure 11:
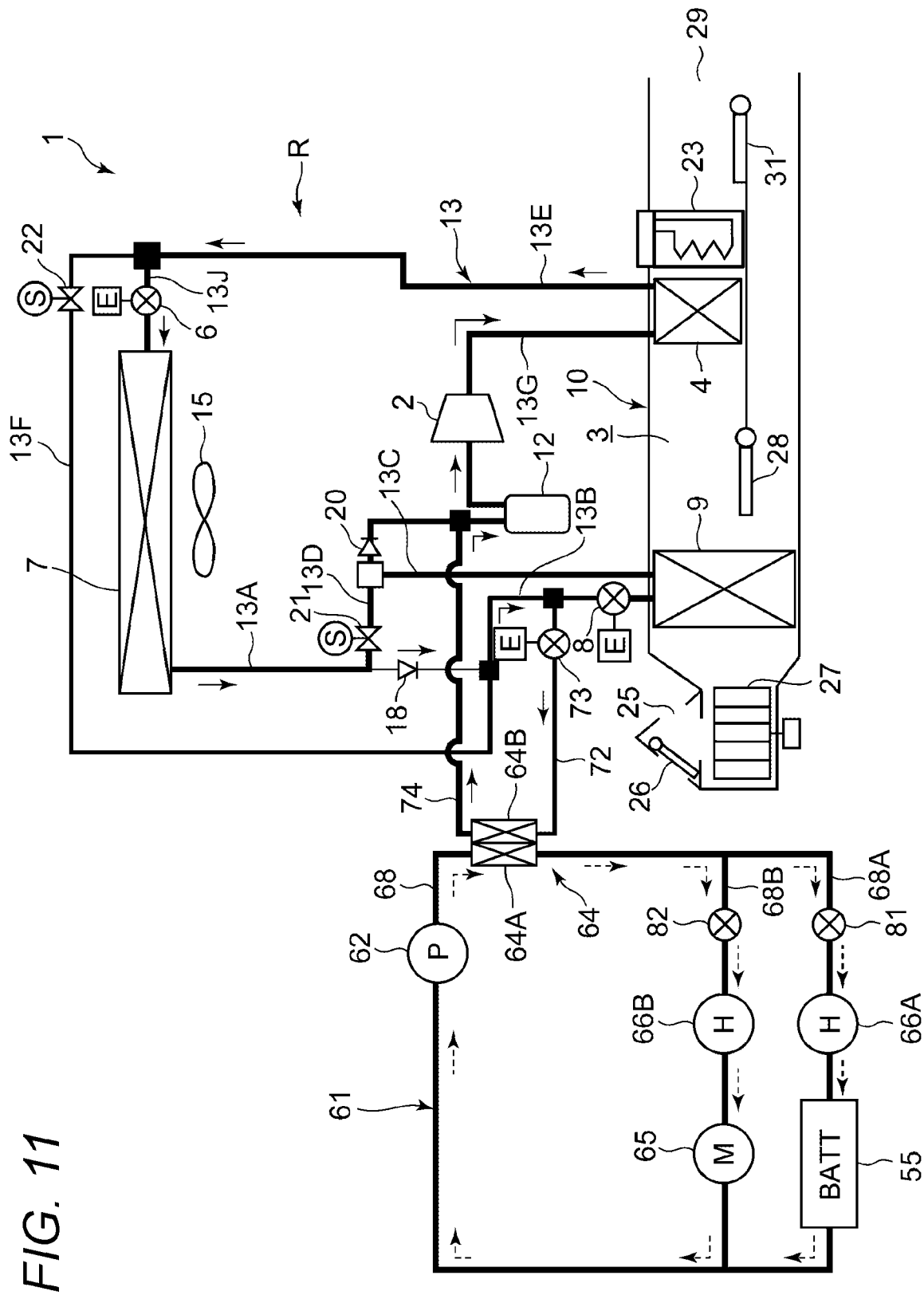
FIG. 11 is a diagram for describing one example of defrosting operation of an outdoor heat exchanger by the air conditioning controller in FIG. 2.

FIG. 11 illustrates the flow (solid line arrow) of the refrigerant in the refrigerant circuit R and the flow (broken line arrow) of the heat medium in the temperature control object temperature adjustment device 61 in the defrosting operation in the example. The air conditioning controller 32 operates the compressor 2 and stops the outdoor fan 15. In addition, the indoor expansion valve 8 is fully closed and the auxiliary expansion valve 73 is opened to decompress the refrigerant. Note that the outdoor expansion valve 6 is fully opened. Furthermore, the air conditioning controller 32 closes the solenoid valve 21 and stops the indoor fan 27. Then, the circulation pump 62 is operated to make the refrigerant and the heat medium exchange heat in the refrigerant-heat medium heat exchanger 64.

Thus, the gas refrigerant with high temperature and high pressure discharged from the compressor 2 flows through the radiator 4 from the refrigerant pipe 13E to the outdoor expansion valve 6. Here, since the outdoor expansion valve 6 is fully open, the refrigerant passes the refrigerant pipe 13J and continuously flows into the outdoor heat exchanger 7. The outdoor heat exchanger 7 is defrosted by the gas refrigerant with high temperature having flowed to the outdoor heat exchanger 7. After the refrigerant radiates heat and is condensed to be liquid, the refrigerant exits from the outdoor heat exchanger 7.

The refrigerant exiting from the outdoor heat exchanger 7 flows in the refrigerant pipe 13B through the refrigerant pipe 13A and here, since the indoor expansion valve 8 is fully closed, the entire refrigerant exiting from the outdoor heat exchanger 7 flows to the auxiliary expansion valve 73 through the branch pipe 72. After the refrigerant is decompressed at this auxiliary expansion valve 73, the refrigerant flows in the refrigerant flow path 64B of the refrigerant-heat medium heat exchanger 64 and then, evaporates. Here, the heat absorption operation is obtained. The refrigerant evaporating in this refrigerant flow path 64B flows in the refrigerant pipe 74, the refrigerant pipe 13C, and the accumulator 12 sequentially and is sucked in the compressor 2; this circulation is repeated. That is to say, in this defrosting operation, the refrigerant circuit R on the refrigerant upstream side from the auxiliary expansion valve 73 including the outdoor heat exchanger 7 is the high pressure side.

On the other hand, in the state where the solenoid valves 81 and 82 are open, the heat medium discharged from the circulation pump 62 flows in the heat medium flow path 64A of the refrigerant-heat medium heat exchanger 64. The heat medium exiting from the heat medium flow path 64A of the refrigerant-heat medium heat exchanger 64 is branched, and one branched heat medium flows to the first heat medium heater 66A through the first solenoid valve 81 and is heated therein in the case where the first heat medium heater 66A generates heat, and then, the heat medium flows to the battery 55 where the heat medium exchanges heat with the battery 55. The other branched heat medium flows to the second heat medium heater 66B through the second solenoid valve 82 and is heated therein in the case where the second heat medium heater 66B generates heat, and then, the heat medium flows to the travel motor 65 where the heat medium exchanges heat with the travel motor 65. The heat mediums having exchanged heat with the battery 55 and the travel motor 65 merge and then, the merged heat medium is sucked in the circulation pump 62; thus, the heat medium circulates in the heat medium pipe 68 (indicated by a broken line arrow in FIG. 11).

In this defrosting operation, in a manner similar to the heating/temperature control object temperature adjustment mode described above, the air conditioning controller 32 controls the auxiliary expansion valve 73, the heat medium heaters 66A and 66B, and the solenoid valves 81 and 82, so as to control the temperature of the battery 55 (battery temperature Tb) and the temperature of the travel motor 65 (travel motor temperature Tm) to be in the respective optimum temperature ranges. Thus, the air conditioning controller 32 independently controls the battery temperature Tb and the travel motor temperature Tm). Therefore, overcooling or overheating of the battery 55 or the travel motor 65 can be prevented.

In particular, in this defrosting operation, the air conditioning controller 32 causes the heat medium heaters 66A and 66B of the temperature control object temperature adjustment device 61 to adjust the temperature of the battery 55 and the travel motor 65 as the temperature control object to be in the optimum temperature range of the predetermined upper limit value or less and the predetermined lower limit value or more. Thus, while the waste heat from the battery 55 or the travel motor 65 or the heat of the heat medium heaters 66A and 66B is used to defrost the outdoor heat exchanger 7, the overcooling or overheating of the battery 55 or the travel motor 65 can be prevented and the battery 55 or the travel motor 65 can function in the optimum state.

(8-2) Defrosting Operation (No. 2)

Figure 12:
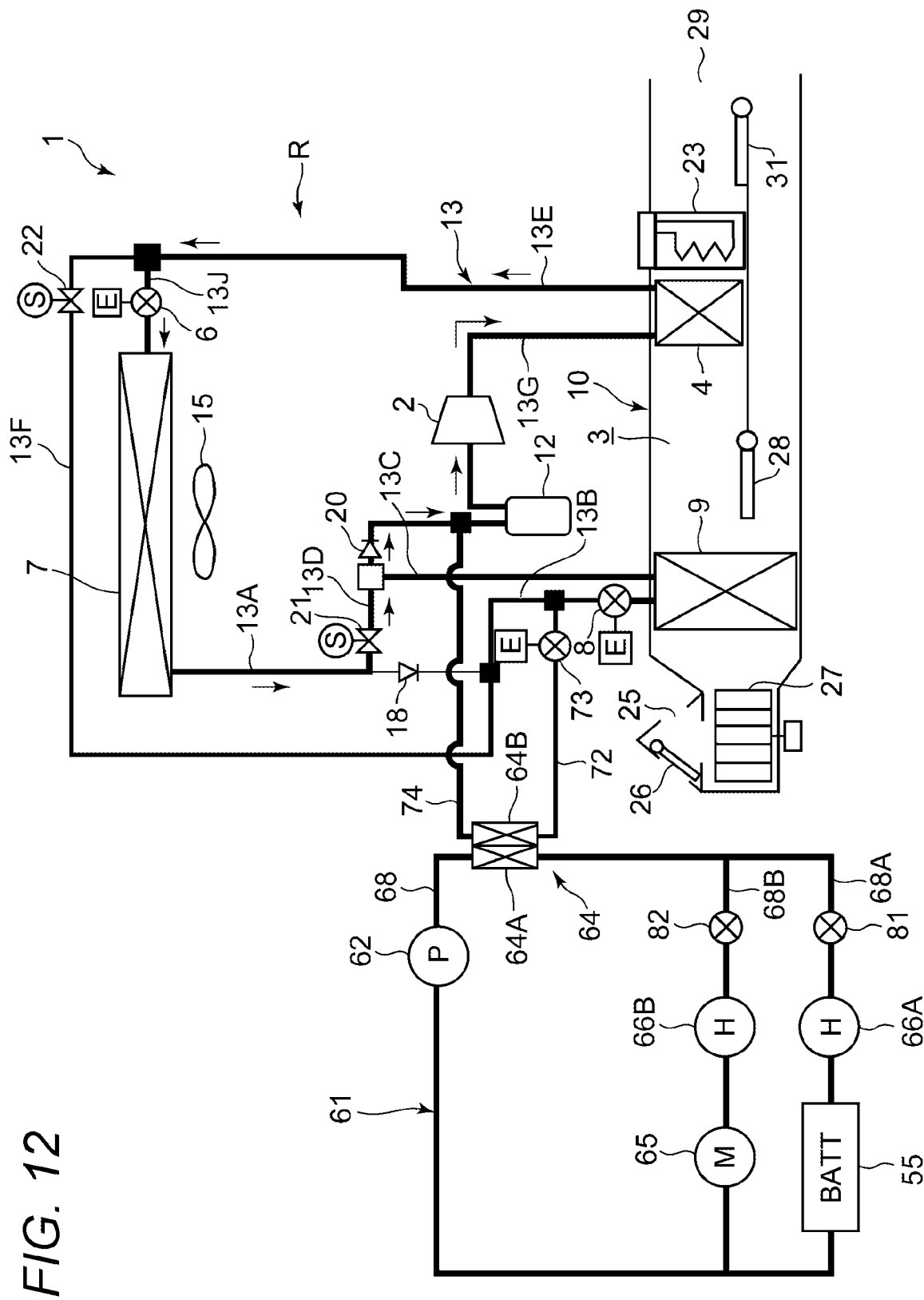
FIG. 12 is a diagram for describing another example of defrosting operation of the outdoor heat exchanger by the air conditioning controller in FIG. 2.

Next, FIG. 12 illustrates another example of the defrosting operation. FIG. 12 illustrates the flow of the refrigerant in the refrigerant circuit R in a case of performing so-called simple defrosting of the outdoor heat exchanger 7. In this simple defrosting, the opening of the outdoor expansion valve 6 is narrowed a little, the solenoid valve 21 is opened, the solenoid valve 22 is closed, and the indoor expansion valve 8 and the auxiliary expansion valve 73 are fully closed. Then, the compressor 2 is operated.

Thus, the gas refrigerant with high temperature and high pressure discharged from the compressor 2 flows from the refrigerant pipe 13E to the outdoor expansion valve 6 through the radiator 4. Here, the refrigerant is narrowed a little and then flows into the outdoor heat exchanger 7 through the refrigerant pipe 13J. Then, the outdoor heat exchanger 7 is defrosted by the gas medium with relatively high temperature having flowed to the outdoor heat exchanger 7. Here, the refrigerant radiates heat but exits from the outdoor heat exchanger 7 while remaining as gas. Then, the refrigerant passes the check valve 20 through the refrigerant pipes 13A and 13D and the solenoid valve 21, and flows into the accumulator 12 through the refrigerant pipe 13C. Then, the refrigerant is sucked in the compressor 2.

(9) Determination as to Whether it is Possible to Perform Defrosting Operation by Air Conditioning Controller 32

If it is determined that the outdoor heat exchanger 7 needs the defrosting operation in the non-charging while the plug 60 is not connected to the external power source, the air conditioning controller 32 determines whether the defrosting operation can be performed on the basis of the outside humidity as described above. The reason is described below with reference to FIG. 13 to FIG. 16.

Figure 13:
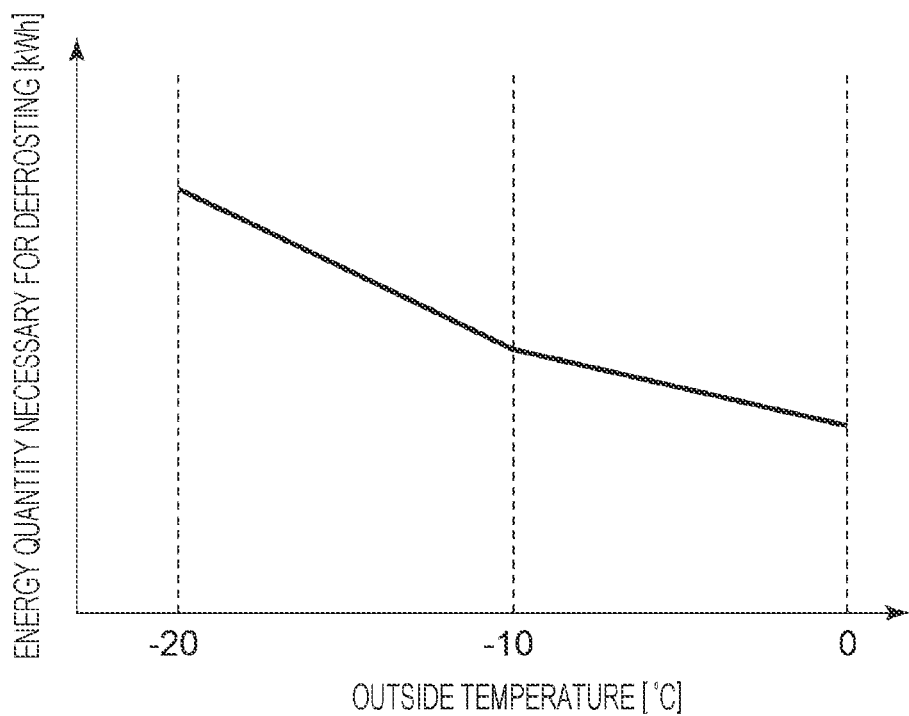
FIG. 13 is a diagram illustrating a relation between outside temperature and energy necessary to defrost the outdoor heat exchanger.

FIG. 13 illustrates the relation between the outside temperature Tam detected by the outside temperature sensor 33 and the energy quantity Ed necessary for defrosting the outdoor heat exchanger 7. When the outside temperature Tam is low, the energy that diffuses into the external air (loss) also increases; thus, as the energy quantity Ed necessary for the defrosting is larger as the outside temperature Tam is lower and the energy quantity Ed is lower as the outside temperature Tam is higher. The energy quantity Ed necessary for the defrosting is calculated from the following expression (II) on the basis of the outside temperature Tam:

$$Ed=f(Tam) \quad (II)$$

Note that energy quantity Ea at which the heat can be absorbed from the external air in the defrosted outdoor heat exchanger 7 is calculated from the following Expression (III) on the basis of the outside temperature Tam and the outside humidity Ham:

$$Ea=f(Tam,Ham) \quad (III)$$

However, as the outside temperature Tam is higher, the heat absorption is easier and as the outside humidity Ham is higher, the frosting occurs more easily and the heat absorption from the external air becomes more difficult.

Figure 14:
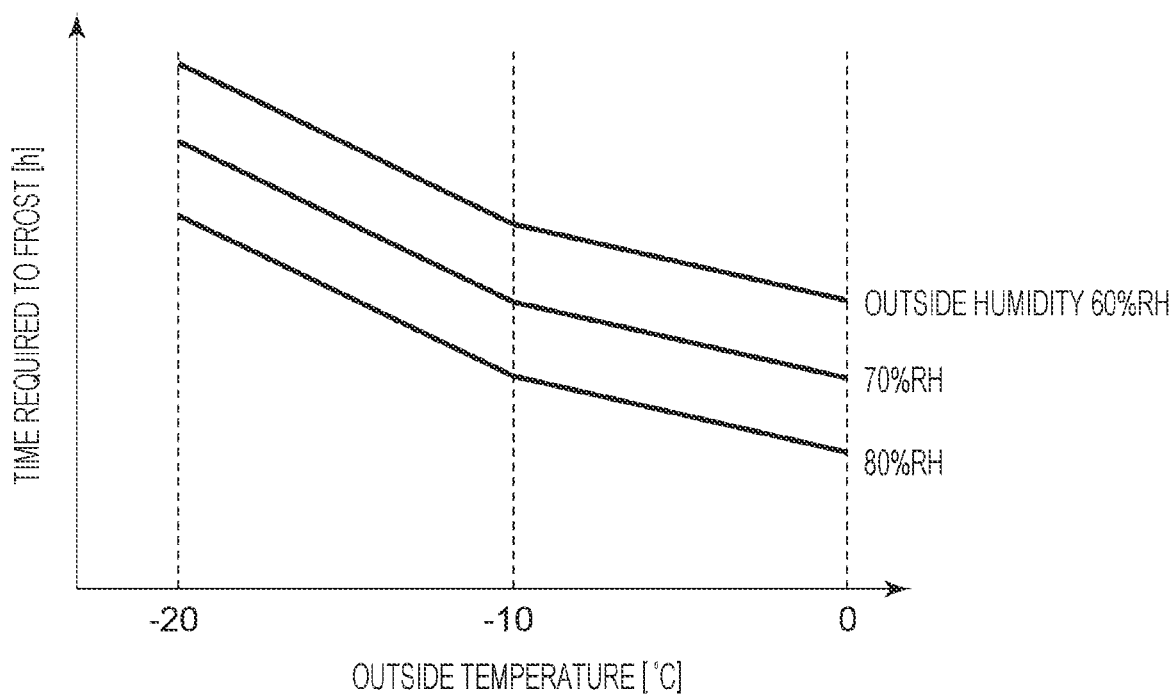
FIG. 14 is a diagram illustrating a relation between outside temperature and time it takes to frost the outdoor heat exchanger.

Next, FIG. 14 illustrates the relation between the outside temperature Tam and the time it takes to frost the outdoor heat exchanger 7. Note that the outside humidity Ham is the relative humidity. As the outside humidity Ham is lower, it takes longer to frost the outdoor heat exchanger 7 (for example, operation time it takes until the air conditioning controller 32 determines that the defrosting is necessary), and as the outside humidity Ham is higher, it takes shorter to frost the outdoor heat exchanger 7. In addition, as the outside temperature Tam is lower, the absolute humidity gets lower and thus, the frosting becomes difficult and it takes longer to frost; on the other and, as the outside temperature Tam is higher, the absolute humidity gets higher and thus, the frosting becomes easy and it takes shorter to frost.

Next, FIG. 15 illustrates the relation between the power consumption (solid line: L1) when the outdoor heat exchanger 7 is defrosted in an environment with the high outside humidity Ham, and the power consumption (broken line: L2) when the heating assistance is performed, that is, when the heat absorption capability of the outdoor heat exchanger 7 that has deteriorated due to defrosting is compensated with the auxiliary heater 23. FIG. 16 illustrates the relation between the power consumption (solid line: L1) when the outdoor heat exchanger 7 is defrosted in an environment with the low outside humidity Ham, and the power consumption (broken line: L2) when the heating assistance is similarly performed using the auxiliary heater 23.

In each drawing, the area where L1 is inclined is the time when the outdoor heat exchanger 7 is defrosted, and the area where L1 is horizontal is the time when the outdoor heat exchanger 7 is not defrosted and the outdoor heat exchanger 7 is currently frosted. In the environment where the outside humidity Ham is high (FIG. 15), frosting takes shorter as described above (the horizontal area is short); therefore, the power consumption (L1) at the defrosting is more than the power consumption (L2) at the heating assistance with the auxiliary heater 23. However, in the environment where the outside humidity Ham is low (FIG. 16), frosting takes longer as described above (the horizontal area is long); therefore, the power consumption (L1) at the defrosting is less than the power consumption (L2) at the heating assistance with the auxiliary heater 23.

(9-1) Determination as to Whether it is Possible to Perform Defrosting Operation (No. 1)

In view of the above, in this example, even if it is determined that the outdoor heat exchanger 7 needs the defrosting operation in the non-charging, the air conditioning controller 32 does not permit the defrosting operation when the outside humidity Ham detected by the outside humidity sensor 34 is more than or equal to a predetermined threshold Hth. In the example, the air conditioning controller 32 changes the threshold Hth using MAP in FIG. 17 on the basis of the outside temperature Tam (in FIG. 17, OK means permitting the defrosting operation and NG means not permitting the defrosting operation).

In the example, when the outside temperature Tam is −5° C. or more, the threshold Hth is 70% RH and when the outside humidity Ham is 70% RH or more, the defrosting operation is not permitted. In addition, when the outside temperature Tam is less than −5° C. and more than −20° C., the threshold Hth is 80% RH and when the outside humidity Ham is 80% RH or more, the defrosting operation is not permitted (in FIG. 17, expressed as −10° C. and −15° C.). Furthermore, when the outside temperature Tam is −20° C. or less, the threshold Hth is 60% RH and when the outside humidity Ham is 60% RH or more, the defrosting operation is not permitted. That is to say, basically, as the outside temperature Tam is lower, the threshold Hth is changed to be smaller. However, at the high outside temperature Tam of −5° C. or more, the absolute humidity becomes higher and defrosting occurs easily. Thus, the heat absorption from the external air also decreases. Accordingly, the threshold Hth is decreased.

In this manner, the air conditioning controller 32 determines whether it is possible to perform the defrosting operation on the basis of the outside humidity Ham detected by the outside humidity sensor 34, and in the example, does not permit the defrosting operation of the outdoor heat exchanger 7 when the outside humidity Ham is more than or equal to the predetermined threshold Hth. Thus, while the adverse influence on the travel distance is reduced as much as possible, the outdoor heat exchanger 7 is defrosted and the heat absorption from the external air is increased, so that the cabin can be heated properly. In particular, the air conditioning controller 32 changes the threshold Hth to become lower as the outside temperature Tam is lower; thus, the air conditioning controller 32 can determine whether it is possible to perform the defrosting operation of the outdoor heat exchanger 7 in accordance with the outside temperature Tam.

(9-2) Determination as to Whether it is Possible to Perform Defrosting Operation (No. 2)

Next, the determination as to whether other defrosting operation can be performed by the air conditioning controller 32 is described. As described above, the air conditioning controller 32 calculates the energy quantity Ed necessary to defrost the outdoor heat exchanger 7 and the energy quantity Ea at which the heat can be absorbed from the external air in the defrosted outdoor heat exchanger 7 using Expression (II) and Expression (III).

Then, if the result of comparing these energy quantities Ed and Ea indicates that Ea>Ed, Ea>Ed+α, or Ea>Ed−β, the air conditioning controller 32 determines that a gain by the heat absorption from the external air is obtained and permits the defrosting operation. The aforementioned α and β are predetermined margins. In a case where the energy quantity Ea at which the heat can be absorbed from the external air in the defrosted outdoor heat exchanger 7 is larger than the value near the energy quantity Ed necessary to defrost the outdoor heat exchanger 7, it means that the gain by the heat absorption from the external air is obtained.

In this manner, the air conditioning controller 32 calculates the energy quantity Ed necessary to defrost the outdoor heat exchanger 7 on the basis of the outside temperature Tam, calculates the energy quantity Ea at which the heat can be absorbed from the external air in the defrosted outdoor heat exchanger 7 on the basis of the outside temperature Tam and the outside humidity Ham, and permits the defrosting operation when the result of comparing these energy quantities Ed and Ea indicates that the gain by the heat absorption from the external air is obtained. Thus, the defrosting operation of the outdoor heat exchanger 7 can be permitted only when the gain obtained by defrosting the outdoor heat exchanger 7 outweighs the loss from the defrosting itself. Therefore, whether it is possible to perform the defrosting operation can be determined more properly.

(9-3) Determination as to Whether it is Possible to Perform Defrosting Operation (No. 3)

Note that in a case where the residual energy quantity of the battery 55 transmitted from the battery controller 40 is less than or equal to a predetermined threshold Bth, the air conditioning controller 32 in the example does not permit the defrosting operation regardless of the aforementioned determination based on the outside humidity Ham. This threshold Bth is a predetermined low residual energy quantity, and when the residual energy quantity of the battery 55 is low, the defrosting operation is not permitted even if the defrosting operation can be permitted in the determination based on the outside humidity Ham as described above. Accordingly, it is possible to surely avoid the inconvenience that the residual energy of the battery 55 runs out because the outdoor heat exchanger 7 is defrosted and the travel cannot be continued.

(9-4) Determination as to Whether it is Possible to Perform Defrosting Operation (No. 4)

In a case where the outside humidity is expected to decrease after this, the defrosting operation is not permitted for now but it is expected that permitting the defrosting operation can obtain the gain. In view of this, in a case where external weather forecast information from the vehicle controller 35 indicates it is expected that the outside humidity decreases after this and the gain by the heat absorption from the external air is obtained, the air conditioning controller 32 in the example permits the defrosting operation even if the defrosting operation cannot be permitted based on the current outside humidity Ham. That is to say, in the example, whether it is possible to perform the defrosting operation of the outdoor heat exchanger 7 can be determined in accordance with the environment change after this.

(9-5) Determination as to Whether it is Possible to Perform Defrosting Operation (No. 5)

In addition, in a case where the outside temperature Tam is expected to increase after this, it is preferable that the defrosting operation is not performed because the outdoor heat exchanger 7 is defrosted naturally. Thus, in a case where the weather forecast information obtained from the vehicle controller 35 includes the forecast saying that the outside temperature Tam is expected to increase, the air conditioning controller 32 in the example does not permit the defrosting operation even if the defrosting operation can be permitted based on the current outside humidity Ham. Accordingly, the unnecessary power consumption of the battery 55 can be avoided.

(9-6) Determination as to Whether it is Possible to Perform Defrosting Operation (No. 6)

In a case where it will still take longer to arrive at the destination, for example, the gain obtained by the heat absorption from the external air is higher when the outdoor heat exchanger 7 is defrosted. In view of this, in the case where the navigation information from the vehicle controller 35 indicates that it will still take longer to arrive at the destination, for example, it is expected that the gain by the heat absorption from the external air is obtained and the air conditioning controller 32 permits the defrosting operation even if the defrosting operation cannot be permitted based on the current outside humidity Ham. Accordingly, whether it is possible to perform the defrosting operation can be determined more properly.

(9-7) Determination as to Whether it is Possible to Perform Defrosting Operation (No. 7)

On the contrary, in a case where the travel distance after this is short, defrosting the outdoor heat exchanger 7 is very likely to be a waste of energy. In view of this, the history information about the driving state of the vehicle from the vehicle controller 35 indicates that the driving state after this that is expected from the history is, for example, a long distance and the gain by the heat absorption from the external air is expected, the air conditioning controller 32 in the example permits the defrosting operation even if the defrosting operation cannot be permitted based on the outside humidity Ham. Thus, in a case where it is expected that the distance the vehicle will drive after this is short on the basis of the past driving state, the defrosting operation is not performed, and the defrosting operation can be performed only when the gain by the heat absorption from the external air is obtained, for example, when the vehicle will drive a long distance.

(10) Forcible Defrosting of Outdoor Heat Exchanger 7

Here, in a case where a user operates (turns on) a forcible defrosting switch 53A that is provided in the air conditioning operation unit 53, the air conditioning controller 32 forcibly performs the defrosting operation of the outdoor heat exchanger 7 regardless of the aforementioned determination about the defrosting necessity or determination about the defrosting permission. Thus, for example, in a case where the distance to a facility where the external power source (such as a quick charger) is set is short and the user determines that using the power from the battery 55 is not a problem, the outdoor heat exchanger 7 is forcibly defrosted and more heat is absorbed from the external air, so that the heating capability of the cabin can be increased.

In the example, whether to perform the defrosting operation is determined using the outside humidity Ham detected by the outside humidity sensor 34; however, if the outside humidity sensor is not mounted, the information about the outside humidity the vehicle controller 35 has acquired through the Internet may be used. The structure of the air conditioning controller 32 and the structures of the refrigerant circuit R or the temperature control object temperature adjustment device 61 in the vehicle air conditioning device 1 are not limited to those described in the example, and various changes are possible in the range without departing from the scope of the present invention.

LIST OF THE REFERENCE NUMERALS

1 Vehicle air conditioning device
2 Compressor
4 Radiator
6 Outdoor expansion valve
7 Outdoor heat exchanger
8 Indoor expansion valve
9 Heat sink
21, 22 Solenoid valve
23 Auxiliary heater
32 Air conditioning controller (control device)
33 Outside temperature sensor 34 Outside humidity sensor
35 Vehicle controller
40 Battery controller
53A Forcible defrosting switch
55 Battery
61 Temperature control object temperature adjustment device
65 Travel motor

What is claimed is:

1. A vehicle air conditioning device comprising:
a compressor that compresses a refrigerant;
a radiator that causes the refrigerant to radiate heat so as to heat air to be supplied to a cabin of a vehicle;
an outdoor heat exchanger that is provided outside the cabin of the vehicle; and
a control device, wherein
the control device is able to perform at least
an air conditioning operation that causes the refrigerant discharged from the compressor to radiate heat in the radiator, decompresses the refrigerant that has radiated heat, and then causes the refrigerant to absorb heat in the outdoor heat exchanger so as to heat the cabin of the vehicle; and
a defrosting operation that causes the refrigerant discharged from the compressor to radiate heat in the outdoor heat exchanger so as to defrost the outdoor heat exchanger, and
the control device determines whether it is possible to perform the defrosting operation on the basis of outside humidity.

2. The vehicle air conditioning device according to claim 1, wherein in a case where the outside humidity is more than or equal to a predetermined threshold, the control device does not permit the defrosting operation.

3. The vehicle air conditioning device according to claim 2, wherein the control device changes the threshold to become lower as outside temperature becomes lower.

4. The vehicle air conditioning device according to claim 1, wherein
the control device calculates an energy quantity Ed necessary to defrost the outdoor heat exchanger on the basis of the outside temperature, and the control device calculates an energy quantity Ea that represents an amount of heat that can be absorbed from external air in the outdoor heat exchanger after the defrosting operation on the basis of the outside temperature and the outside humidity, and
the control device permits the defrosting operation when it is determined that a gain by heat absorption from the external air is obtained as a result of comparing the energy quantities Ed and Ea.

5. The vehicle air conditioning device according to claim 1, wherein where a residual energy quantity of a battery is less than or equal to a predetermined threshold, the control device does not permit the defrosting operation regardless of the outside humidity.

6. The vehicle air conditioning device according to claim 4, wherein where the gain by the heat absorption from the external air is expected to be obtained based on weather forecast information, the control device permits the defrosting operation regardless of the outside humidity.

7. The vehicle air conditioning device according to claim 1, wherein where an outside temperature is expected to increase on the basis of a weather forecast information, the control device does not permit the defrosting operation regardless of the outside humidity.

8. The vehicle air conditioning device according to claim 4, wherein where the gain by the heat absorption from the external air is expected to be obtained on the basis of navigation information, the control device permits the defrosting operation regardless of the outside humidity.

9. The vehicle air conditioning device according to claim 4, wherein where the gain by the heat absorption from the external air is expected to be obtained on the basis of a future driving state of a vehicle that is expected based on a driving state history information, the control device permits the defrosting operation regardless of the outside humidity.

10. The vehicle air conditioning device according to claim 1, wherein the control device forcibly performs the defrosting operation on the basis of a predetermined input operation.

* * * * *